(12) United States Patent
Leather et al.

(10) Patent No.: US 12,445,883 B2
(45) Date of Patent: Oct. 14, 2025

(54) CONSIDERING DATA STREAM SEPARATION CAPABILITY IN WIRELESS COMMUNICATION NETWORKS

(71) Applicant: Fraunhofer-Gesellschaft zur Förderung der angewandten Forschung e.V., Munich (DE)

(72) Inventors: Paul Simon Holt Leather, Berlin-Schlachtensee (DE); Thomas Haustein, Berlin (DE); Ramez Askar, Berlin (DE); Wilhelm Keusgen, Berlin (DE); Leszek Raschkowski, Berlin (DE); Mathis Schmieder, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 692 days.

(21) Appl. No.: 17/670,676

(22) Filed: Feb. 14, 2022

(65) Prior Publication Data

US 2022/0217566 A1     Jul. 7, 2022

Related U.S. Application Data

(63) Continuation of application No. PCT/EP2020/072177, filed on Aug. 6, 2020.

(30) Foreign Application Priority Data

Aug. 14, 2019  (EP) .................................... 19191830

(51) Int. Cl.
*H04W 4/00*    (2018.01)
*H04W 24/10*   (2009.01)

(52) U.S. Cl.
CPC .................................. *H04W 24/10* (2013.01)

(58) Field of Classification Search
CPC ..... H04W 24/10; H04W 24/02; H04W 24/08; H04B 7/0628; H04B 7/0417;
(Continued)

(56) References Cited

U.S. PATENT DOCUMENTS 5,440,564 A  *  8/1995  Ovadia ................. H04J 3/1682
                                                          370/537
5,873,028 A  *  2/1999  Nakano ................ H04W 52/12
                                                          455/127.1

(Continued)

FOREIGN PATENT DOCUMENTS

CN       108886389 A      11/2018
CN       110115097 A       8/2019
(Continued)

OTHER PUBLICATIONS

"3GPP TR 23.743", 3rd Generation Partnership Project; Technical Specification Group Services and System Aspects; Study on optimisations of UE radio capability signalling (Release 16) 2018.
(Continued)

*Primary Examiner* — Amancio Gonzalez
(74) *Attorney, Agent, or Firm* — Perkins Coie LLP; Michael A. Glenn

(57) ABSTRACT

An apparatus configured for wirelessly communicating in a wireless communication network includes a wireless interface arrangement having a signal maintenance capability to separate at least one data stream. The apparatus is configured for wirelessly transmitting, to a receiving apparatus, a capability signal having a capability information indicating the signal maintenance capability.

6 Claims, 12 Drawing Sheets

(58) Field of Classification Search
CPC .. H04B 7/0619; H04B 17/309; H04B 17/382; H04B 17/391; H04B 7/0697; H04L 1/203
USPC .................................................. 455/422.1
See application file for complete search history.

(56) References Cited

U.S. PATENT DOCUMENTS

| | | | | |
|---|---|---|---|---|
| 5,884,220 A * | 3/1999 | Farmer | G01S 19/41 | 342/357.44 |
| 5,951,709 A * | 9/1999 | Tanaka | H03M 13/2933 | 714/755 |
| 5,960,335 A * | 9/1999 | Umemoto | H04B 17/21 | 370/332 |
| 6,018,313 A * | 1/2000 | Engelmayer | G01S 5/009 | 342/357.44 |
| 6,040,759 A * | 3/2000 | Sanderson | H04B 3/542 | 375/259 |
| 6,384,780 B2 * | 5/2002 | Walley | H01Q 3/267 | 375/140 |
| 6,525,616 B1 * | 2/2003 | Williams | H03L 7/08 | 331/34 |
| 6,567,720 B1 * | 5/2003 | Figiel | G01N 33/346 | 162/263 |
| 6,594,287 B1 * | 7/2003 | Seytter | H04J 3/22 | |
| 6,741,935 B1 * | 5/2004 | Eschenbach | G01S 5/009 | 701/484 |
| 6,898,416 B2 * | 5/2005 | Saarinen | H04W 24/08 | 455/67.11 |
| 6,946,920 B1 * | 9/2005 | Williams | H04L 7/0083 | 331/34 |
| 7,003,058 B2 * | 2/2006 | Bach | H04J 99/00 | 356/453 |
| 7,212,549 B1 * | 5/2007 | Wimmer | H04L 1/0061 | 714/751 |
| 7,274,749 B2 * | 9/2007 | Ball | H03F 1/34 | 375/297 |
| 7,290,184 B2 * | 10/2007 | Bruner | G11B 20/1866 | 714/704 |
| 7,339,980 B2 * | 3/2008 | Grant | H04B 1/7107 | 375/148 |
| 7,397,843 B2 * | 7/2008 | Grant | H04B 1/712 | 375/150 |
| 7,574,179 B2 * | 8/2009 | Barak | H04L 5/0023 | 705/37 |
| 7,606,334 B2 * | 10/2009 | D'Amico | H04L 25/0232 | 370/342 |
| 7,616,603 B2 * | 11/2009 | Anderson | H04L 1/08 | 455/450 |
| 7,701,901 B2 * | 4/2010 | Anderson | H04W 72/1268 | 370/337 |
| 7,719,281 B2 * | 5/2010 | Fontius | G01R 33/36 | 324/318 |
| 7,733,287 B2 * | 6/2010 | Hardacker | H01Q 25/00 | 343/824 |
| 7,957,485 B2 * | 6/2011 | Cairns | H04L 25/03898 | 375/267 |
| 7,983,353 B2 * | 7/2011 | Grant | H04B 7/0426 | 375/267 |
| 8,023,450 B2 * | 9/2011 | Abedi | H04L 47/54 | 370/332 |
| 8,090,061 B1 * | 1/2012 | Zhang | H03G 3/3078 | 375/345 |
| 8,194,563 B2 * | 6/2012 | Walton | H04B 7/0619 | 370/468 |
| 8,243,782 B2 * | 8/2012 | Mobin | H04L 25/03057 | 375/232 |
| 8,295,417 B2 * | 10/2012 | Cairns | H04B 1/7117 | 375/348 |
| 8,311,023 B1 * | 11/2012 | Negus | H04L 27/2636 | 455/461 |
| 8,369,790 B2 * | 2/2013 | Li | H04B 7/0697 | 455/67.11 |
| 8,396,368 B2 * | 3/2013 | Tarlazzi | H04J 14/028 | 398/115 |
| 8,401,485 B2 * | 3/2013 | Jongren | H04B 17/24 | 455/67.11 |
| 8,412,257 B2 * | 4/2013 | Kim | H04L 5/0028 | 370/341 |
| 8,576,946 B2 * | 11/2013 | Chugg | H04B 7/026 | 714/752 |
| 8,594,692 B2 * | 11/2013 | Kimura | H04W 72/541 | 455/452.2 |
| 8,693,522 B2 * | 4/2014 | Ma | H04B 7/0413 | 375/135 |
| 8,693,964 B2 * | 4/2014 | Nabar | H03F 3/245 | 455/115.3 |
| 8,755,477 B1 * | 6/2014 | Park | H04B 7/0871 | 375/295 |
| 8,774,006 B2 * | 7/2014 | Schloemer | H04B 7/26 | 455/445 |
| 8,781,011 B2 * | 7/2014 | Grant | H04B 1/712 | 375/267 |
| 8,805,459 B2 * | 8/2014 | Pohlabeln | H01Q 1/242 | 455/575.1 |
| 8,811,990 B2 * | 8/2014 | Jeong | H04W 36/00835 | 455/435.2 |
| 8,902,961 B1 * | 12/2014 | Nabar | H04L 25/0222 | 375/225 |
| 8,942,216 B2 * | 1/2015 | Negus | H04L 5/14 | 455/461 |
| 8,942,317 B2 * | 1/2015 | Chari | H04L 7/042 | 375/326 |
| 8,953,480 B2 * | 2/2015 | Alm | H04L 1/0019 | 455/452.2 |
| 9,019,836 B2 * | 4/2015 | Klingenbrunn | H04L 5/001 | 370/236 |
| 9,088,391 B2 * | 7/2015 | Chari | H04L 27/2657 | |
| 9,107,104 B2 * | 8/2015 | Chen | H04L 1/0028 | |
| 9,124,427 B2 * | 9/2015 | Ho | H04L 1/1883 | |
| 9,184,962 B2 * | 11/2015 | Tarlazzi | H04L 27/20 | |
| 9,247,435 B2 * | 1/2016 | Shad | H04W 16/28 | |
| 9,288,731 B1 * | 3/2016 | White | H04W 36/00226 | |
| 9,363,729 B2 * | 6/2016 | Senarath | H04W 72/0446 | |
| 9,661,517 B2 * | 5/2017 | Stott | H04B 7/0452 | |
| 9,723,359 B2 * | 8/2017 | Raveendran | H04N 21/43637 | |
| 9,730,607 B2 * | 8/2017 | Gärber | G06T 7/0016 | |
| 9,742,599 B2 * | 8/2017 | Iyer Seshadri | H04L 25/03847 | |
| 9,781,638 B2 * | 10/2017 | Davydov | H04B 17/318 | |
| 9,801,168 B2 * | 10/2017 | Moulsley | H04B 7/024 | |
| 9,813,085 B1 * | 11/2017 | Butler | H04L 5/22 | |
| 9,838,192 B2 * | 12/2017 | Zhang | H04L 5/0085 | |
| 9,979,450 B2 * | 5/2018 | Jiang | H04B 7/0473 | |
| 9,983,000 B2 * | 5/2018 | Malmsheimer | F16D 66/028 | |
| 10,004,078 B2 * | 6/2018 | Palm | H04L 5/0098 | |
| 10,020,963 B2 * | 7/2018 | Klomsdorf | H04B 7/0689 | |
| 10,056,941 B2 * | 8/2018 | Weissman | H04B 3/487 | |
| 10,098,019 B2 * | 10/2018 | Martin | H04W 76/27 | |
| 10,187,880 B2 * | 1/2019 | Xiao | H04B 7/088 | |
| 10,237,094 B2 * | 3/2019 | Kuhlmann | H04L 5/0048 | |
| 10,243,704 B2 * | 3/2019 | Yiu | H04L 5/001 | |
| 10,264,613 B2 * | 4/2019 | Kawasaki | H04B 17/336 | |
| 10,462,684 B2 * | 10/2019 | Martin | H04W 24/02 | |
| 10,469,215 B2 * | 11/2019 | Rakib | H04L 5/0007 | |
| 10,491,350 B2 * | 11/2019 | Fitch | H04L 5/0085 | |
| 10,582,407 B2 * | 3/2020 | Martin | H04W 16/14 | |
| 10,645,591 B2 * | 5/2020 | Ode | H04W 76/10 | |
| 10,674,418 B2 * | 6/2020 | Wong | H04L 5/0051 | |
| 10,708,740 B2 * | 7/2020 | Jang | H04W 88/10 | |
| 10,739,399 B2 * | 8/2020 | Schnattinger | H04B 1/1027 | |
| 10,756,925 B2 * | 8/2020 | Hustava | H04L 12/40 | |
| 10,917,147 B2 * | 2/2021 | Duxbury | H04B 1/0483 | |
| 10,938,462 B2 * | 3/2021 | Azogui | H04W 40/14 | |
| 10,959,251 B2 * | 3/2021 | Hosseini | H04W 28/0257 | |
| 11,051,307 B2 * | 6/2021 | Huang | H04W 72/0446 | |
| 11,140,651 B2 * | 10/2021 | Ayyalasomayajula | H04L 25/0216 | |
| 11,150,352 B2 * | 10/2021 | Kuntz | G01S 19/37 | |
| 11,165,471 B2 * | 11/2021 | Agrawal | H04B 7/0413 | |
| 11,165,517 B2 * | 11/2021 | Agrawal | H04B 17/11 | |
| 11,184,125 B2 * | 11/2021 | Zhou | H04B 7/063 | |

(56) References Cited

U.S. PATENT DOCUMENTS

| | | | |
|---|---|---|---|
| 11,297,490 B2* | 4/2022 | Pals | H04L 1/0003 |
| 11,342,940 B2* | 5/2022 | Xiao | H03M 13/27 |
| 11,356,876 B2* | 6/2022 | Kurth | H04W 24/10 |
| 11,374,557 B2* | 6/2022 | Jann | H03B 19/14 |
| 11,381,291 B2* | 7/2022 | Zhang | H04B 7/0626 |
| 11,387,852 B2* | 7/2022 | Banin | H04L 25/49 |
| 11,489,958 B2* | 11/2022 | Ökvist | H04W 24/02 |
| 11,558,074 B2* | 1/2023 | Paker | H04B 1/1081 |
| 11,568,573 B2* | 1/2023 | Hamza | G06T 9/00 |
| 11,581,934 B2* | 2/2023 | Zander | H04L 5/0053 |
| 11,606,138 B1* | 3/2023 | Speidel | H04B 7/18513 |
| 11,621,811 B2* | 4/2023 | Da Silveira | H04B 7/06 375/267 |
| 11,871,473 B2* | 1/2024 | Cirik | H04W 76/19 |
| 11,979,177 B2* | 5/2024 | Banin | H04B 1/04 |
| 11,979,801 B2* | 5/2024 | Badic | H04W 72/51 |
| 11,991,703 B2* | 5/2024 | Teyeb | H04W 72/21 |
| 12,010,053 B2* | 6/2024 | Khoryaev | H04L 27/2613 |
| 12,022,507 B2* | 6/2024 | Wang | H04W 74/0833 |
| 12,035,184 B2* | 7/2024 | Liu | H04W 76/30 |
| 12,035,306 B2* | 7/2024 | Wong | H04L 5/0037 |
| 2002/0193146 A1 | 12/2002 | Wallace et al. | |
| 2003/0014763 A1* | 1/2003 | Chappell | H04H 20/78 725/111 |
| 2005/0078580 A1* | 4/2005 | Kochale | G11B 20/18 |
| 2005/0141459 A1* | 6/2005 | Li | H04L 25/0204 370/334 |
| 2007/0097939 A1* | 5/2007 | Nylander | H04W 68/00 455/525 |
| 2007/0271590 A1* | 11/2007 | Gulas | H04L 65/752 725/126 |
| 2010/0120380 A1* | 5/2010 | Otani | H04B 17/382 455/115.1 |
| 2010/0159845 A1 | 6/2010 | Kaaja et al. | |
| 2010/0260147 A1 | 10/2010 | Xing et al. | |
| 2011/0182257 A1* | 7/2011 | Raveendran | H04N 21/2402 370/329 |
| 2012/0009959 A1* | 1/2012 | Yamada | H04L 25/0226 455/507 |
| 2013/0029588 A1* | 1/2013 | Bienas | H04W 48/18 455/7 |
| 2013/0040684 A1 | 2/2013 | Yu et al. | |
| 2013/0100228 A1* | 4/2013 | Tapia | H04N 21/26216 348/14.01 |
| 2013/0286960 A1 | 10/2013 | Li et al. | |
| 2014/0024323 A1 | 1/2014 | Clevorn et al. | |
| 2014/0038619 A1* | 2/2014 | Moulsley | H04B 7/0413 455/446 |
| 2014/0226649 A1* | 8/2014 | Webb | H04L 5/0048 370/350 |
| 2016/0080094 A1 | 3/2016 | Kim et al. | |
| 2016/0105871 A1* | 4/2016 | Kwak | H04W 56/0015 370/336 |
| 2016/0182136 A1 | 6/2016 | Zhang et al. | |
| 2016/0262133 A1* | 9/2016 | Yang | H04W 72/23 |
| 2017/0353955 A1* | 12/2017 | Hsu | H04W 72/0453 |
| 2019/0037548 A1 | 1/2019 | Costa et al. | |
| 2019/0207731 A1 | 7/2019 | Park et al. | |
| 2020/0084820 A1 | 3/2020 | Wiberg et al. | |
| 2021/0144198 A1* | 5/2021 | Yu | H04W 28/0967 |
| 2021/0286089 A1* | 9/2021 | Dai | G01S 19/073 |
| 2022/0004810 A1* | 1/2022 | Sinha | G06N 3/08 |
| 2022/0038057 A1* | 2/2022 | Gutman | H04B 17/354 |
| 2022/0141699 A1* | 5/2022 | Yue | H04W 72/51 370/329 |
| 2022/0149922 A1* | 5/2022 | Wang | H04B 7/0626 |
| 2022/0248277 A1* | 8/2022 | Cheng | H04W 36/08 |
| 2022/0394806 A1* | 12/2022 | Rugeland | H04W 76/19 |
| 2023/0078501 A1* | 3/2023 | Wang | H04L 5/0023 370/252 |
| 2023/0200663 A1* | 6/2023 | McCombie | A61B 5/0024 600/595 |

FOREIGN PATENT DOCUMENTS

| | | |
|---|---|---|
| JP | 2015523757 A | 8/2015 |
| KR | 20150015447 A | 2/2015 |
| WO | 2013169055 A1 | 11/2013 |
| WO | 2018201908 A1 | 11/2018 |

OTHER PUBLICATIONS

"3GPP TR 38.822 V16.2.0", 3rd Generation Partnership Project; Technical Specification Group Radio Access Network; NR; User Equipment (UE) feature list (Release 16), Dec. 2021.

"3GPP TR 38.840", 3rd Generation Partnership Project; Technical Specification Group Radio Access Network; NR; Study on UE Power Saving (Release 16) 2019.

"3GPP TS 38.101-4 V15.2.0", 3rd Generation Partnership Project; Technical Specification Group Radio Access Network; NR; User Equipment (UE) radio transmission and reception; Part 4: Performance requirements (Release 15) 2019.

"3GPP TS 38.300", 3rd Generation Partnership Project; Technical Specification Group Radio Access Network; NR; NR and NG-RAN Overall Description; Stage 2 (Release 16) 2021.

"ETSI TR 138 912 V16.0.0", 5G; Study on New Radio (NR) access technology (3GPP TR 38.912 version 16.0.0 Release 16), Jul. 2020.

"ETSI TS 125 211 V16.0.0", Universal Mobile Telecommunications System (UMTS); Physical channels and mapping of transport channels onto physical channels (FDD) (3GPP TS 25.211 version 16.0.0 Release 16), Sep. 2020.

"New WI proposal: DL MIMO efficiency enhancements for LTE", Huawei, HiSilicon, TELUS, SoftBank, III, Telstra, Telecom Italia, Telefonica, Turkcell, ITRI, CATR, ASTRI, Etisalat, China Telecom, RP-181485, 3GPP TSG RAN Meeting #80, La Jolla, USA, Jun. 11-14, 2018.

"WI Proposal on NR MIMO Enhancements", Samsung; RP-181453, 3GPP TSG RAN Meeting #80, La Jolla, USA, Jun. 11-14, 2018.

Liu, Xia, et al., "Effect of Antenna Mutual Coupling on MIMO Channel Estimation and Capacity", School of ITEE, The University of Queensland, Brisbane, QLD 4072, Australia, Jan. 2010.

3GPP TR 38.804 3rd Generation Partnership Project; Technical Specification Group Radio Access Network; Study on New Radio Access Technology; Radio Interface Protocol Aspects (Release 14) V14.0.0 (Mar. 2017) (57 pages).

3GPP TR 38.840 "Study on UE power saving in NR (Release 16)", 16.0.0 (Jun. 2019) (74 pages).

* cited by examiner

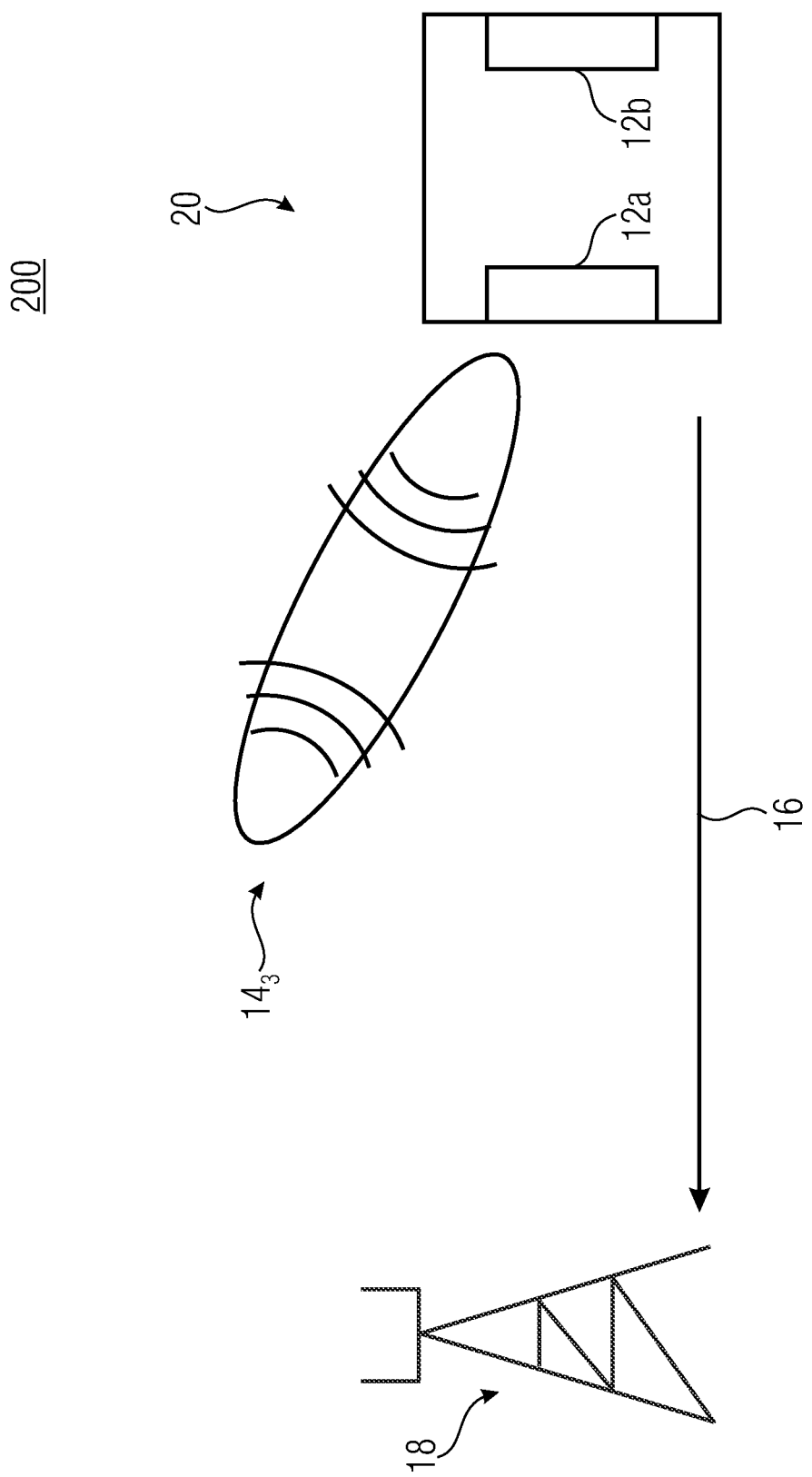

800

810 — Measuring a property of the radio propagation channel between the first node and the second node so as to obtain a measurement result

820 — Correcting the measurement result at least partly from an impairment caused from operating a first communication chain of the first node on a second communication chain of the first node; and/or correcting the measurement result at least partly from an impairment caused from operating a third communication chain of the second node on a fourth communication chain of the second node; each communication chain configured for wirelessly transmitting and/or wirelessly receiving signals using a wireless interface, to obtain a corrected measurement result of the propagation channel

Fig. 8

CONSIDERING DATA STREAM SEPARATION CAPABILITY IN WIRELESS COMMUNICATION NETWORKS

CROSS-REFERENCES TO RELATED APPLICATIONS

This application is a continuation of copending International Application No. PCT/EP2020/072177, filed Aug. 6, 2020, which is incorporated herein by reference in its entirety, and additionally claims priority from European Applications No. EP 19 191 830.9, filed Aug. 14, 2019, which is incorporated herein by reference in its entirety.

BACKGROUND OF THE INVENTION

The present application related to the field of wireless communication systems or networks, more specifically to approaches for making wireless communication in such networks more efficient. Embodiments concern improvements in communication adaptation and radio channel considerations. Embodiments further relate to a method to determine the user equipment's spatial data stream separation capability.

In TSG SA#79 and TSG RAN#79 discussion took place on defining mechanisms for optimizing the UE radio capability signalling. RAN sent an LS to TSG SA (cc' SA WG2) indicating: "... conceptual work should be performed in SA WG2 and RAN WG2 (with potential involvement of other relevant WGs such as RAN WG3 and CT WG1) since the network should store and manage such UE capability IDs".

Some form of efficient signaling of the UE Radio Capabilities, is to be investigated, which may also rely on an efficient representation of UE capabilities.

Solutions shall take into account a device may have certain features upgraded, e.g. due to a new SW release, or disabling of certain radio capabilities.

The discussion in TSG RAN and SA WG2 previously considered some options for such efficient representation:
1. Using a hash function over the UE capability;
2. Using components or all of IMEI-SV, i.e., TAC+SVN;
3. Using a newly defined identifier.

Other options are possible and can be considered.

The study will also determine whether any identifier used for such efficient representation needs to be globally unique (i.e. standardized), or PLMN-specific or manufacturer-specific.

Starting from that background, there may be a need for improvements in the communication in wireless communication networks.

SUMMARY

An embodiment may have an apparatus configured for wirelessly communicating in a wireless communication network, the apparatus comprising: a wireless interface arrangement comprising a signal maintenance capability to separate at least one data stream; wherein the apparatus is configured for wirelessly transmitting, to a receiving apparatus, a capability signal comprising a capability information indicating the signal maintenance capability.

Another embodiment may have a base station configured for operating at least a cell of a wireless communication network, the cell comprising an apparatus being associated with the base station, the base station comprising: an antenna arrangement configured for transmitting to and/or receiving from the apparatus a plurality of data streams; wherein the base station is configured for receiving a capability signal comprising a capability information indicating a signal maintenance capability of the apparatus; wherein the base station is configured for using a set of data streams from the plurality of data streams for communicating with the apparatus; and wherein the base station is configured for selecting the set of data streams based on the capability information.

Another embodiment may have a wireless communication network comprising: at least one apparatus according to the invention; and at least one base station according to the invention.

Another embodiment may have a method for operating an apparatus for wirelessly communicating in a wireless communication network, the apparatus comprising a wireless interface arrangement comprising a signal maintenance capability to separate at least one data stream; the method having the steps of: wirelessly transmitting, to a receiving apparatus, a capability signal comprising a capability information indicating the signal maintenance capability.

Another embodiment may have a method for operating a base station for operating at least a cell of a wireless communication network, the cell comprising an apparatus being associated with the base station, the base station configured for transmitting and/or receiving a plurality of data streams with an antenna arrangement; the method having the steps of: receiving a capability signal comprising a capability information indicating a signal maintenance capability of the an apparatus; using a set of data streams for communicating with the apparatus; and selecting the set of data streams based on the capability information.

Another embodiment may have a non-transitory digital storage medium having a computer program stored thereon to perform the method for operating an apparatus for wirelessly communicating in a wireless communication network, the apparatus comprising a wireless interface arrangement comprising a signal maintenance capability to separate at least one data stream; the method having the steps of: wirelessly transmitting, to a receiving apparatus, a capability signal comprising a capability information indicating the signal maintenance capability, when said computer program is run by a computer.

Another embodiment may have a non-transitory digital storage medium having a computer program stored thereon to perform the method for operating a base station for operating at least a cell of a wireless communication network, the cell comprising an apparatus being associated with the base station, the base station configured for transmitting and/or receiving a plurality of data streams with an antenna arrangement; the method having the steps of: receiving a capability signal comprising a capability information indicating a signal maintenance capability of the an apparatus; using a set of data streams for communicating with the apparatus; and selecting the set of data streams based on the capability information, when said computer program is run by a computer.

Another embodiment may have a method for determining a signal maintenance capability of an apparatus, the method having the steps of: operating, in an operation mode, an apparatus so as to cause the apparatus to maintain at least a first data stream using a wireless interface arrangement of the apparatus; determining the signal maintenance capability of the apparatus associated with the operation mode; and storing the signal maintenance capability in a memory.

Another embodiment may have a non-transitory digital storage medium having a computer program stored thereon to perform the method for determining a signal maintenance capability of an apparatus, the method having the steps of: operating, in an operation mode, an apparatus so as to cause the apparatus to maintain at least a first data stream using a wireless interface arrangement of the apparatus; determining the signal maintenance capability of the apparatus associated with the operation mode; and storing the signal maintenance capability in a memory, when said computer program is run by a computer.

Another embodiment may have a measurement environment comprising: a holder configured for holding an apparatus; a control unit configured for controlling the apparatus to operate the apparatus, under an operation mode, in which the apparatus maintains at least a first data stream using a wireless interface arrangement of the apparatus; a determining unit configured for determining the signal maintenance capability of the apparatus associated with the operation mode; and a memory wherein the measurement environment is configured for storing the signal maintenance capability in the memory.

Another embodiment may have a method for evaluating a radio propagation channel between a first node and a second node in a wireless communication network, the method having the steps of: measuring a property of the radio propagation channel between the first node and the second node so as to acquire a measurement result; correcting the measurement result at least partly from an impairment caused from operating a first communication chain of the first node on a second communication chain of the first node; and/or correcting the measurement result at least partly from an impairment caused from operating a third communication chain of the second node on a fourth communication chain of the second node; each communication chain configured for wirelessly transmitting and/or wirelessly receiving signals using a wireless interface, to acquire a corrected measurement result of the propagation channel.

Another embodiment may have a non-transitory digital storage medium having a computer program stored thereon to perform the method for evaluating a radio propagation channel between a first node and a second node in a wireless communication network, the method having the steps of: measuring a property of the radio propagation channel between the first node and the second node so as to acquire a measurement result; correcting the measurement result at least partly from an impairment caused from operating a first communication chain of the first node on a second communication chain of the first node; and/or correcting the measurement result at least partly from an impairment caused from operating a third communication chain of the second node on a fourth communication chain of the second node; each communication chain configured for wirelessly transmitting and/or wirelessly receiving signals using a wireless interface, to acquire a corrected measurement result of the propagation channel, when said computer program is run by a computer.

Another embodiment may have an apparatus comprising a memory having stored therein impairment information indicating an impairment caused from operating a first communication chain of the apparatus on a second communication chain of the apparatus.

Another embodiment may have an apparatus configured for controlling a wireless communication to a further apparatus based on impairment information indicating an impairment caused from operating a first communication chain of the further apparatus on a second communication chain of the further apparatus.

BRIEF DESCRIPTION OF THE DRAWINGS

Embodiments of the present invention will be detailed subsequently referring to the appended drawings, in which:

FIG. 3a-b show schematic block diagrams of the wireless communication network of FIG. 2 with varied relative position between an apparatus and a base station according to an embodiment;

FIG. 8 shows a schematic flow chart of a method for evaluating the radio propagation channel between a first node and a second node in a wireless communication network according to an embodiment;

DETAILED DESCRIPTION OF THE INVENTION

Figure 1:
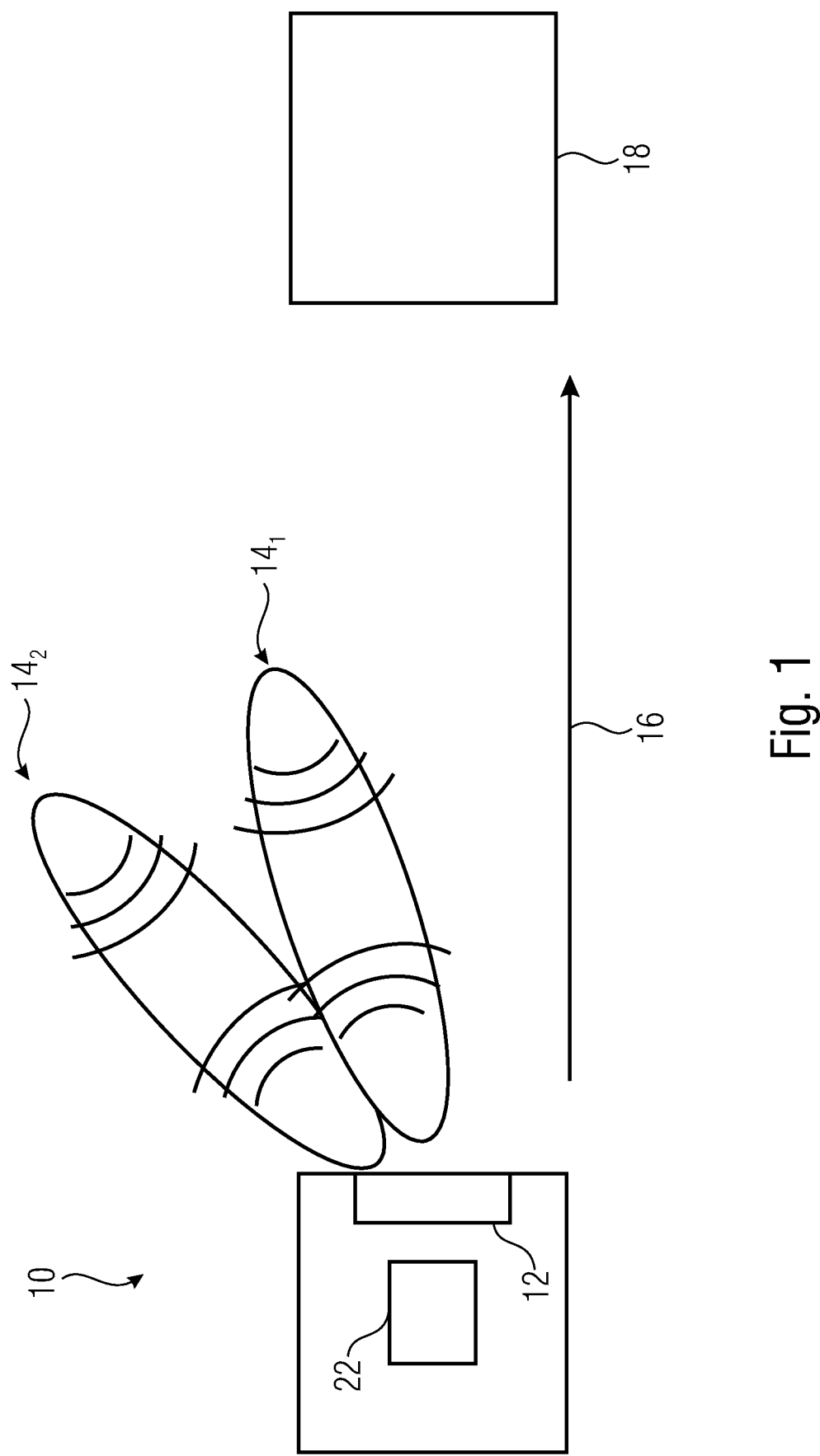
FIG. 1 shows a schematic block diagram of an apparatus according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described herein relate to communication in wireless communication networks and to methods, procedures and measurement environments for providing data and information that allow to enhance the communication in wireless communication networks. Although the embodiments described herein may relate to mobile communication networks such as long-term evolution (LTE) or new radio/ 5G, the scope of the embodiments is not limited hereto. Embodiments relate to communicating, to another node, about own capabilities in view of data stream separation to allow the other node to limit its effort in connection with optimizing communication. In particular, such communication in view of the data stream separation capability may be used to avoid unnecessary optimization efforts at the other node that would go beyond their own capabilities. Such embodiments are not limited to a specific network structure or architecture.

Other embodiments described herein relate to a model which is considered when determining parameters of an apparatus. Such a model considers antennas of a transmitter and of a receiver as being excluded from the radio channel, therefore allowing to separately consider cross-effects between antennas, e.g., between different communication chains, e.g., transmission chains and/or receiving chains. Thereby, a precise determination of the radio channel may be obtained.

A first aspect of embodiments described herein relates to informing other network nodes about own capabilities in view of data stream separation. Such a capability in connection with the described embodiments is based on a priori knowledge of the device's capability. That is, the device capability may be a feature of the device, e.g., of the antenna arrangement such as based on a relative position of antennas inside a housing. This feature may be independent from a channel that is accessed by the device. For this reason, the device capability has to be discriminated from other information such as a Rank Indicator (RI) that may be understood as a channel dependent information. Whilst the RI is based on or derived from a channel assessment made by the user equipment, the capability information according to embodiments is based on the a priori knowledge of the device's capability and may therefore be independent from a radio channel property of a radio channel used by the device and, therefore, independent from a propagation environment of the apparatus. The signal maintenance capability is more a capability of the wireless interface arrangement or the part/portion/section of the wireless interface arrangement being used for communication. Such differences also apply to other known information like the Channel Quality Indicator (CQI) and the Precoding Matrix Indicator (PMI) which are also channel-dependent.

A second aspect of embodiments described herein relates to determining such a separation capability information.

A third aspect of embodiments described herein relates to mechanisms that optimize performance through knowledge of device capabilities which may be based on a special mode of the radio propagation channel.

FIG. 1 shows a schematic block diagram of an apparatus 10 being configured for wirelessly communicating in a wireless communication network. For example, the apparatus 10 may be configured for operating in a cell of the wireless communication network. The apparatus 10 may be any device configured for operating in a wireless communication network, for example, an IoT (Internet of Things) device, a user equipment (UE), a vehicle, a base station or the like.

For wirelessly communicating in the wireless communication network, the apparatus 10 may comprise a wireless interface arrangement 12. The wireless interface arrangement 12 may comprise an antenna arrangement. The apparatus may comprise a controller that may be part of the antenna arrangement 12 or may be implemented separately. The wireless interface arrangement 12 may comprise one or more antenna elements. Having a plurality of antenna elements may allow to group such antenna elements to antenna arrays, antenna panels or the like. The wireless interface arrangement 12 may allow the apparatus 10 to maintain one or more data streams $14_1$, $14_2$ at a time. Each data stream $14_1$ and $14_2$ may comprise a transmission and/or a reception of data and/or signals. To maintain data stream $14_2$ at a time may be understood as simultaneously maintaining the data streams $14_1$ and $14_2$. This may include but is not limited to simultaneously, at a specific instance of time transmit and/or receive bits of different data streams but is related more general to processing data streams. For example, different data streams may be transmitted and/or received in different frames, subframes, time slots or subcarriers. According to one example, the signal maintenance capability indicating a capability to separate at least one data stream $14_1$ and/or $14_2$ may be understood as a multiple input multiple output (MIMO) capability. The signal maintenance capability may include to have no capability at all, that is, the apparatus 10 may be configured for maintaining or separating only one single data stream $14_1$ or $14_2$. According to an embodiment, the apparatus 10 may separate or maintain two or more data streams.

Separating a data stream from another data stream may be performed by the apparatus 10 based on properties or characteristics that different within the data streams $14_1$ and $14_2$. For example, the data streams $14_1$ and $14_2$ may differ from each other in at least one of a time domain, a frequency domain, a code domain, a spatial domain, an orbital angular momentum, an angular difference of a lobe or null of a beam pattern or a part thereof. Alternatively or in addition, the data streams $14_1$ and $14_2$ may differ from each other in the polarization domain.

Embodiments described herein may describe data streams $14_1$ and $14_2$ as beams of a beam pattern so as to provide for a vivid description of the embodiments. However, any other difference between the data streams or a combination of differences may be implemented. In view of beams, the data streams $14_1$ and $14_2$ may be understood as spatial data streams that may be separated by the apparatus 10 based on a decorrelation using its MIMO capability. The signal maintenance capability may relate to device capability of the apparatus 10 and may indicate an upper limit for the communication to be maintained or executable with the apparatus 10 within the wireless communication network. For example the apparatus 10 may be configured for generating the capability signal 16 such that the capability information indicates a maximum number of spatial data streams and/or other data streams being utilizable simultaneously with the wireless interface arrangement. For example, the capability information may indicate at least a capability of the apparatus 10 to utilize an indicated number of beams received and/or transmitted with the wireless antenna arrangement 12. For example, the apparatus 10 may be configured for receiving a first spatial data stream with a first beam and for simultaneously or sequentially receiving a second spatial data stream with a second beam. The wireless interface arrangement 12 may be configured for separating the first and second spatial data stream from each other based on the signal maintenance capability. Alternatively or in addition, the first and second spatial data stream may be transmitted with a first beam, a second beam respectively. Based on the signal maintenance capability, the data streams being transmitted with the first and the second beam may be separated from each other. As described, the first spatial data stream (beam) and the second spatial data stream (beam) may be received or transmitted simultaneously.

The apparatus 10 may comprise a memory 22 having stored thereon the capability information. The capability information may be any kind of encoded or uncoded information.

This device capability may be independent from a propagation environment of the apparatus. In other words, the apparatus 10 may be configured to obtain a specific number of data streams at a same time, for example, in an ideal environment. Although some of those data streams may not be maintained in a real environment or scenario, this will not change the signal maintenance capability in view of a path being blocked to the base station, for example, in case a car travels between a UE and a base station. Nevertheless, the maintenance capability may be specific for an operating mode or orientation of the apparatus 10. For example, the apparatus 10 may have knowledge about a user being positioned with respect to the apparatus 10. E.g., the apparatus 10 may determine that a head of a user is near its display such that the apparatus 10 decides not to transmit beams towards the head. Such a scenario may change the present or current maintenance capability but not as an effect of the radio channel but as an effect of the operating mode. As another example, the apparatus 10 may be configured for maintaining different numbers of data streams along different directions starting from the apparatus. That is, when a communication partner, e.g., a base station, is arranged on varying sides or orientations with respect to the apparatus 10, the maintenance capability may vary based on different or varying capabilities of the apparatus 10 along different sides.

The apparatus 10 is configured for wirelessly transmitting a capability signal 16 to a receiving apparatus 18. The apparatus 10 may transmit the capability signal 16 repeatedly, during an association or re-association with a base station, when setting a peer-to-peer communication and/or repeatedly, e.g., in regular or irregular time intervals or upon having determined a variation in its maintenance capability. Such an association may occur, for example, when powering up the apparatus, when having performed a handover, during an association in a new cell or when setting up a network. The apparatus 10 may alternatively transmit the capability signal 16 responsive to receiving a corresponding request signal. For example, the base station may transmit once, regularly or in irregular intervals, a respective request.

The capability signal 16 may indicate the signal maintenance capability such that the receiving apparatus 18 may obtain knowledge about the maintenance capability of the apparatus 10. This allows the receiving apparatus 18 and/or an apparatus to which the maintenance capability information is forwarded, to consider the capabilities of the apparatus 10 when adapting communication. For example, the receiving apparatus 18 may try to improve data transmission by adapting a beam and/or by generating further beams towards the apparatus 10. Based on a knowledge about the upper limit of the signal maintenance capability, the receiving apparatus 18 may avoid trying unnecessary or non-effective attempts to increase or improve communication.

Figure 2:
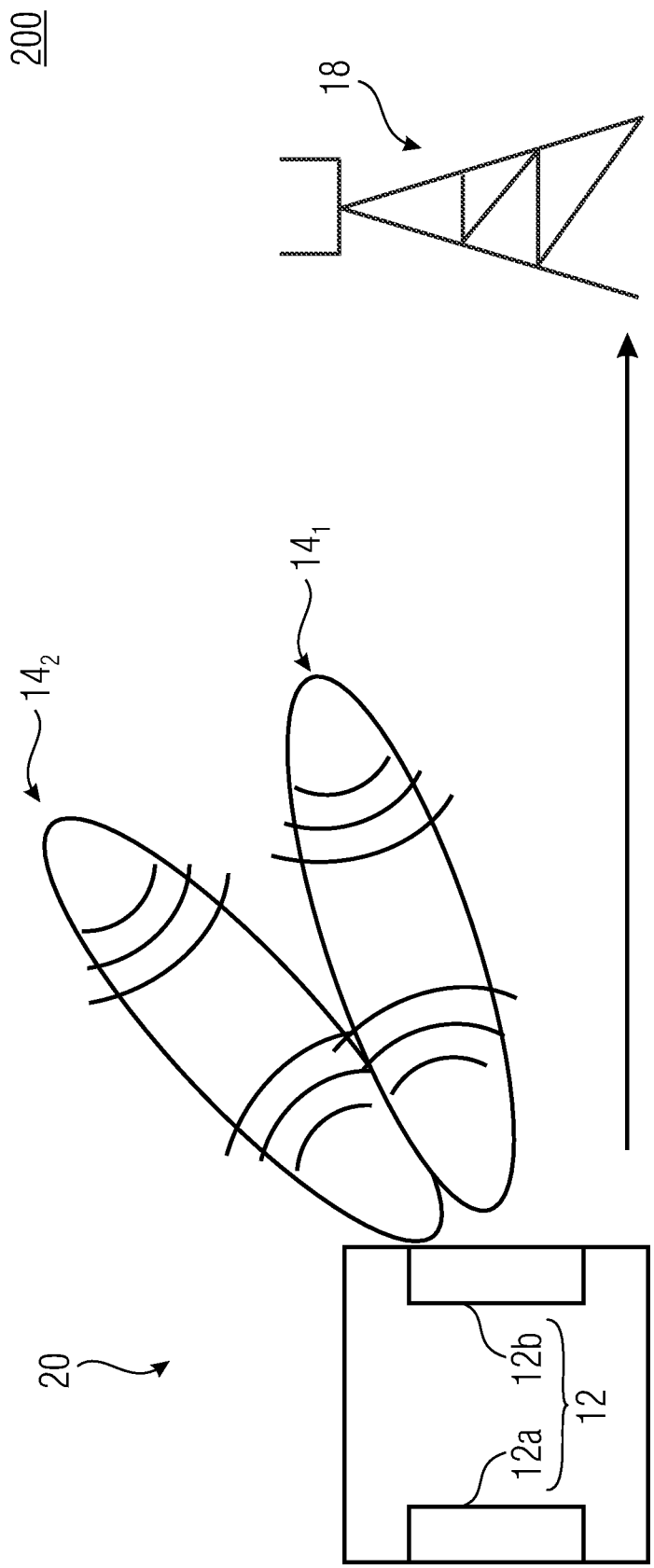
FIG. 2 shows a schematic block diagram of a part of a wireless communication network according to an embodiment.

FIG. 2 shows a schematic block diagram of a wireless communication network 200, a cell thereof respectively. For example, the receiving apparatus 18 may be a base station operating the wireless communication network cell. An apparatus 20 may associate or re-associate with the base station 18. Alternatively, the apparatus 20 may already be associated with the base station 18. The apparatus 20 may have at least a first and a second antenna arrangement 12a and 12b being parts of the wireless interface arrangement 12. Each antenna arrangement may be implemented so as to allow for beamforming. The apparatus 20 may be configured for individually using the antenna arrangement 12a or the antenna arrangement 12b for wireless communication, i.e., either the antenna arrangement 12a or 12b. Alternatively, the apparatus 20 may be configured for combinatorially using the antenna arrangements $12_1$ and $12_2$ for wireless communication. Although the apparatus 20 is described as comprising two antenna arrangements, each antenna arrangement being implemented so as to allow for beamforming, the apparatus 20 may comprise a different, in particular higher number of antenna arrangements, for example, 3, 4, 5, 10, 20 or more.

The wireless interface arrangement 12 may be configured for associating each separable data stream with a communication channel of the apparatus. For example, different applications being executed by the apparatus may each maintain one or more communication channels which are processed simultaneously by a physical layer (PHY) of the apparatus.

Figure 3A:
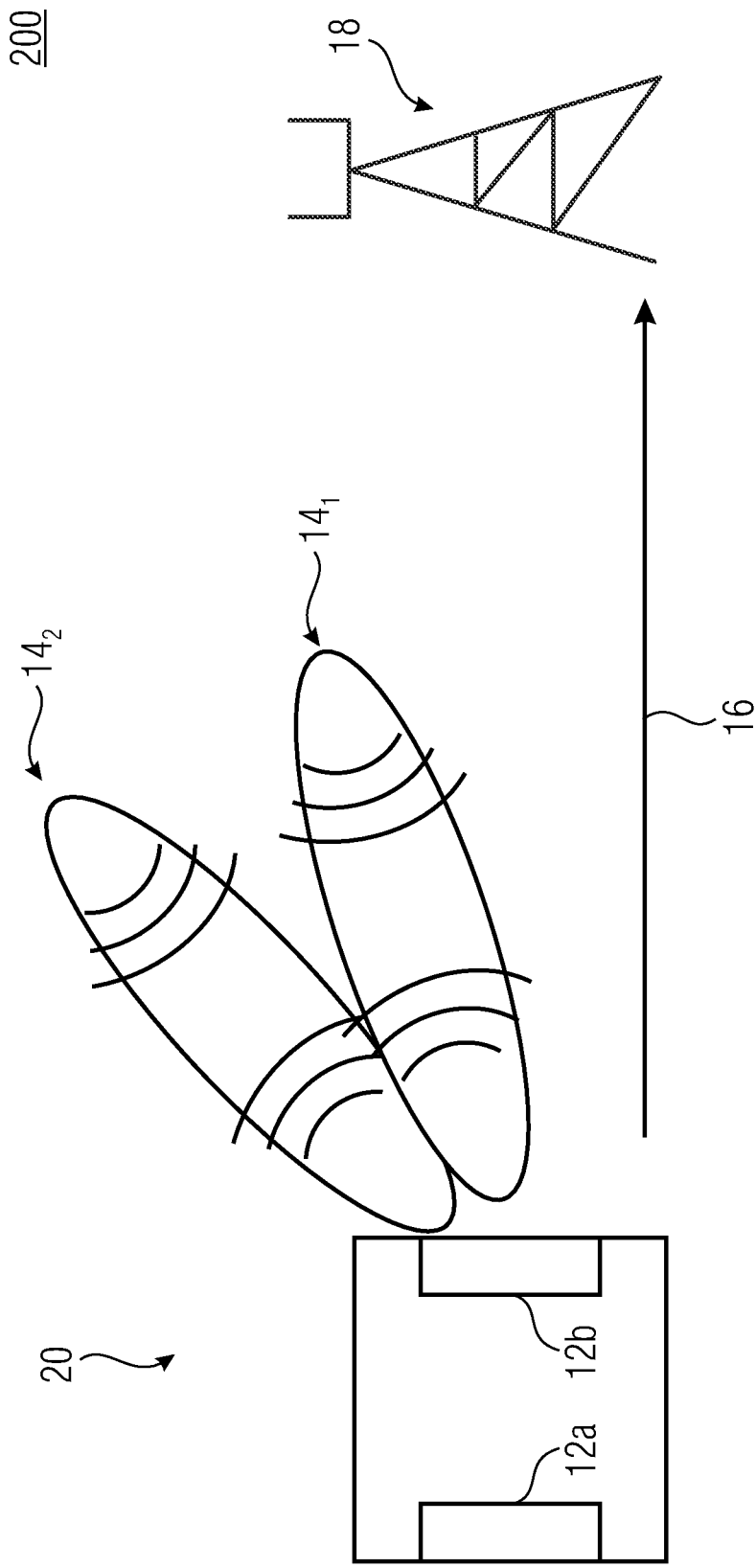

FIG. 3a and FIG. 3b show schematic block diagrams of the wireless communication network 200 of FIG. 2. A relative position between apparatus 20 and the base station 18 has changed between the illustration of FIG. 3a and FIG. 3b. In FIG. 3a, the antenna arrangement 12b is used by the apparatus 20 so as to communicate with the base station 18. The antenna arrangement 12b may be implemented to maintain a first number of data streams, e.g., two, and may be used for communication with the base station 18 as it faces the base station 18.

In FIG. 3b, the apparatus 20 uses antenna arrangement 12a to communicate with the base station 18. The antenna arrangement 12a may be configured for maintaining a different second number of data streams, e.g., the data stream $14_3$. The apparatus may determine that the signal maintenance capability is changed from the maintenance capability of FIG. 3a to a varied signal maintenance capability. The apparatus may report the varied signal maintenance capability to the base station 18, for example, by transmitting again a capability signal 16. Alternatively or in addition to a variation in a position that may lead to a change in an antenna arrangement used by the apparatus 20 for communication, the apparatus 20 may be configured for determining that the signal maintenance capability has changed based on one or more of a change of an operation mode of the apparatus, an orientation of the apparatus, and/or a position of at least a part of a user relative to the apparatus. For example, in different operating modes, the apparatus 20 may consume different levels of power allowing a different number of data streams to be utilized. For example in different orientations of the apparatus, the apparatus may use different numbers of data streams and/or different antenna arrangements. The apparatus 20 may be configured for reporting the varied signal maintenance capability periodically, responsive to having determined the change or responsive to a request received with the wireless interface arrangement 12.

The capability information transmitted to the receiving apparatus 18 may be specific for the apparatus 20, 10 respectively. This may include the capability information to be specific for the device class, i.e., for a class of devices to which the device belongs. For example, a same device series, all devices being built equally, may have stored thereon a respective identifier or capability information that indicates the device so as to belong to the device class. Alternatively, the capability information may indicate the device individually. Based thereon, the receiving apparatus 18 may determine or derive the capability of the device. That is, the apparatus 10 and/or 20 may indicate its capability so as to be interpreted by the receiving apparatus without further knowledge. Alternatively or in addition, the device may indicate itself, e.g., using an identifier or may identify a class to which it belongs. This may allow the receiving apparatus 18 to interpret or derive the capability information when having further knowledge about the device or device class. The capability information to be transmitted with the capability signal 16 may relate to an uplink capability and/or a downlink capability of the apparatus. A combined capability information may indicate both, the uplink and the downlink capability. Different capabilities for uplink and downlink may be transmitted as different information in a same signal or as different signals.

Figure 4:
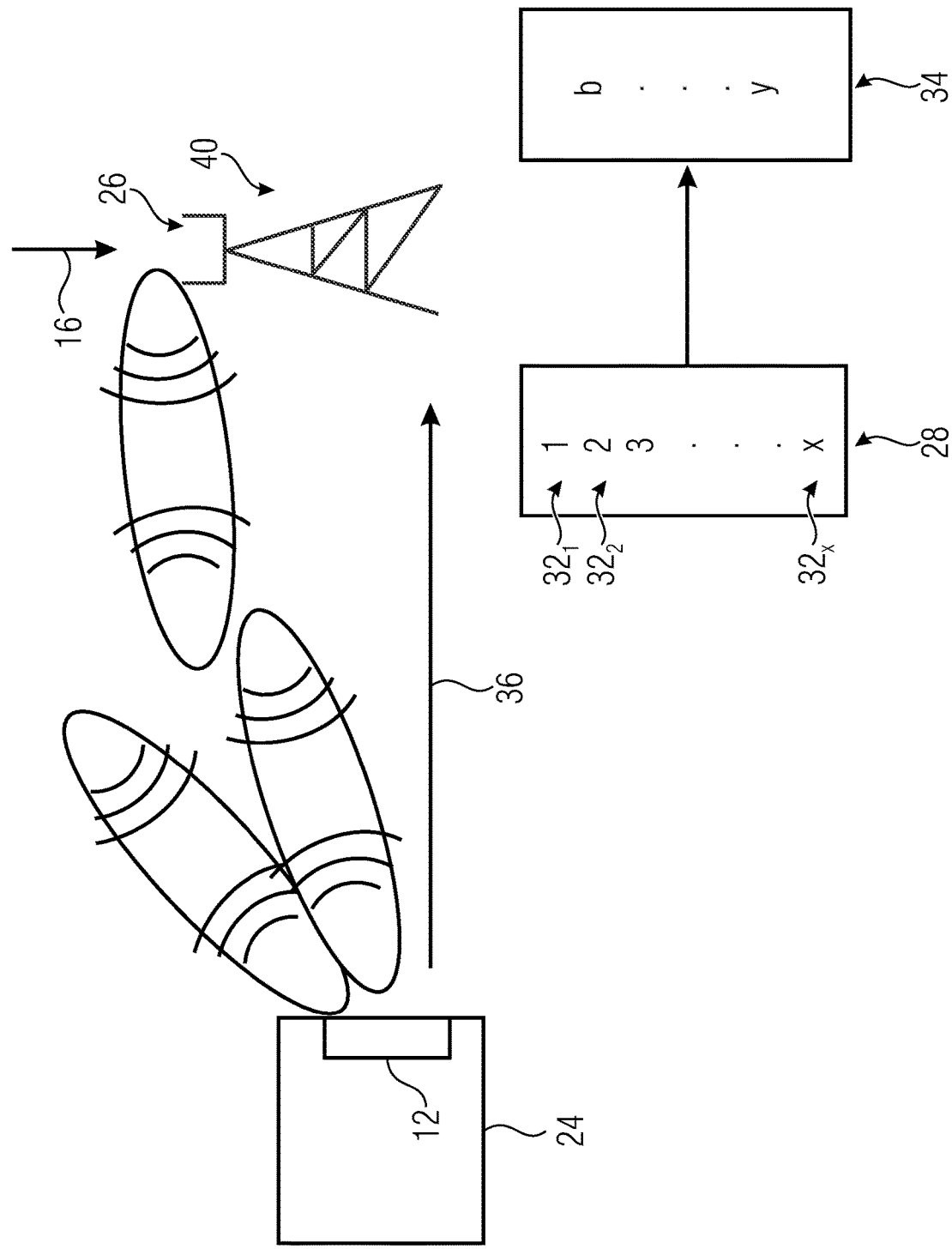
FIG. 4 shows a schematic block diagram of a base station according to an embodiment.

FIG. 4 shows a schematic block diagram of a base station 40 according to an embodiment. The base station 40 is configured for operating at least a cell of a wireless communication network, for example, the wireless communication network 200. By way of example, one or more apparatuses 24 may be associated with the base station 40. The apparatus 24 may be implemented, for example, as apparatus 10 and/or 20. The base station 40 comprises an antenna arrangement 26 configured for transmitting and/or receiving to or from the apparatus 24 a plurality of data streams. By way of example, a plurality of transmission and/or reception beams may be formed towards the apparatus 24, wherein the data stream 14 is not limited to such a spatial data stream, as described. The base station is configured for receiving the capability signal 16 comprising the capability information indicating a signal maintenance capability of the apparatus 24. The capability signal 16 may be transmitted by the apparatus 24 but may, alternatively, be received by a central network node, for example, in the backbone.

The base station 40 may use the antenna arrangement 26 to form in total a set 28 of data streams $31_1$ to $32_x$ with x being any number larger than 1, for example, at least 5, at least 10, at least 20 or at least 50. Within the capability of the base station 40, one or more data streams $32_i$ with i=1, . . . , x, may be used by the base station 40. Upon having knowledge about the signal maintenance capability of the apparatus 24, the base station 40 may limit the set 28 by selecting a subset 34 of the set 28, for example, having a lower number of data streams 32. This may also be understood as the base station 40 may decide, responsive to the capability information, to limit efforts in view of optimizing communication with the apparatus 24. For example, a number of beams or spatial data streams may be limited. Alternatively or in addition, a modulation coding scheme (MCS), a spatial spreading, a selection of time slots, a selection of code or the like may be limited according to the capability of the apparatus 24. Each of those different properties may be understood as a separate or different data stream. Further influencing parameters may be, for example, a data rate, a latency or the like to be adapted.

The apparatus 24 may provide for a feedback information 36. This feedback information 36 may be received as a respective wireless data signal by the base station 40. The base station 40 may be configured for adaptively adapting the set 34 responsive to the feedback information 36. The feedback information 36 may indicate a data transmission quality of a data transmission between the base station 40 and the apparatus 24. For example, a signal-to-noise ratio (SNR) or signal plus interference-to-noise ratio (SINR) or a channel quality indicator (CQI) or the like or a combination thereof may be transmitted. For example, the base station 40 may determine that the transmission quality in the uplink and/or downlink is below a desired transmission quality. That is, the base station 40 may determine that the channel is of poor quality. The base station may be configured for adapting the set 34 so as to increase the transmission quality of the data transmission within the signal maintenance capability of the apparatus. That is, according to an embodiment, the base station 40 is configured to limit its efforts to increase the transmission quality to the signal maintenance capability of the apparatus 24. For example, the capability information may indicate at least a capability of the apparatus 24 to utilize an indicated number of beams received or transmitted with its wireless antenna arrangement 12. The base station 40 may be configured to select the set 34 of data streams such that a number of data streams of the set 34 is at most the number indicated in the capability signal 16.

As described, the base station 40 may be configured for providing or supplying the network with an association procedure with the apparatus 24 when it associates or re-associates with the cell. The base station 40 may be configured to query the capability information 16 during such an association procedure.

This may allow to prevent the apparatus 24 to transmit the capability signal 16 in case it associates with a cell that is not making use of such information. Alternatively or in addition to querying for the capability information, the base station may be configured for transmitting a request signal indicating a request to report the capability information prior or after the association or re-association procedure. Such a request signal may be transmitted to the apparatus 24 itself or to a central data base of the wireless network, thereby querying if the apparatus 24 is already known within the central node.

Figure 5:
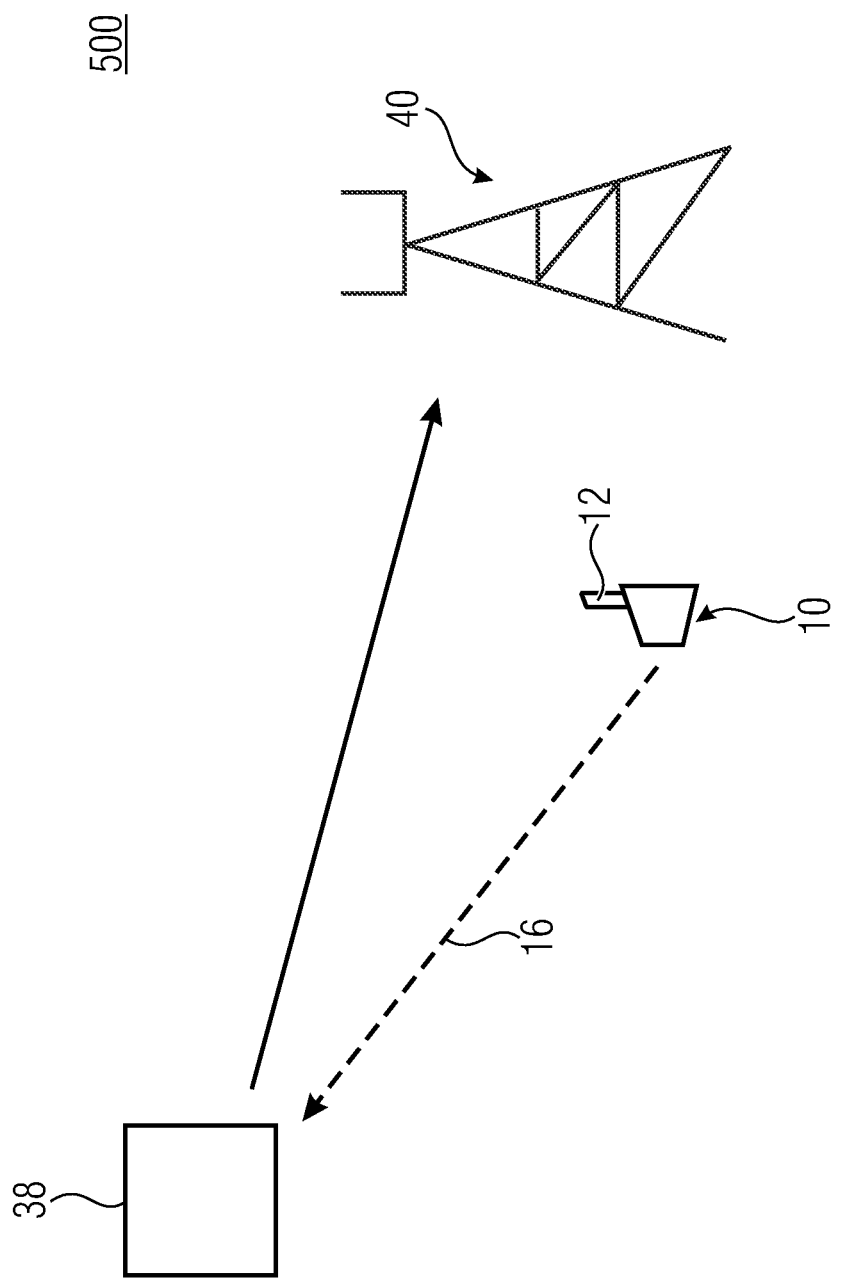
FIG. 5 shows a schematic block diagram of a wireless communication network according to an embodiment, having at least one apparatus and at least one base station.

FIG. 5 shows a schematic block diagram of a wireless communication network 500 according to an embodiment, the wireless communication network 500 may comprise at least one apparatus 10, 20 and/or 24. The wireless communication network may further comprise at least one base station 18 and/or 40. The wireless communication network 500 may optionally comprise a database 38 accessible for the at least one base station 40. The data base 38 may comprise the signal maintenance capability of the apparatus 10. The capability signal 16 may directly or indirectly be transmitted to the database 38. Based thereon, the database 38 may contain a measure for at least a first data signal and a second data signal or data stream maintainable by the apparatus 10. Such a measure may be at least one of an error vector magnitude (EVM), a signal-to-interference-plus-noise ratio (SINR), a bit error rate (BER), a block error rate (BNER) and/or a combination thereof. This may allow for precise information about the capability of the apparatus 10 to be present at the base station 40. The wireless communication network 500 may be configured for repeatedly updating the database 38, for example, by updating the capabilities associated with a device class, for example, by a manufacturer and/or upon receiving the capability signal 16 directly or indirectly from the apparatus 10. According to an embodiment, a method for operating an apparatus for wirelessly communicating in a wireless communication network, wherein the apparatus comprises a wireless interface arrangement having a signal maintenance capability to separate at least one data stream, comprises wirelessly transmitting, to a receiving apparatus, a capability signal comprising a capability information indicating the signal maintenance capability. This method may be used, for example, for operating the apparatus 10 and/or 20.

According to an embodiment, a method for operating a base station for operating at least a cell of a wireless communication network, the cell having an apparatus being associated with the base station, the base station configured for transmitting and/or receiving a plurality of data streams with an antenna arrangement, comprises a step in which a capability signal comprising a capability information indicating a signal maintenance capability of the apparatus is received. In a further step, a set of data streams is used for communicating with the apparatus. In a further step, the set of data streams is selected based on the capability information. A sequence or order of the steps may be implemented differently.

Figure 6:
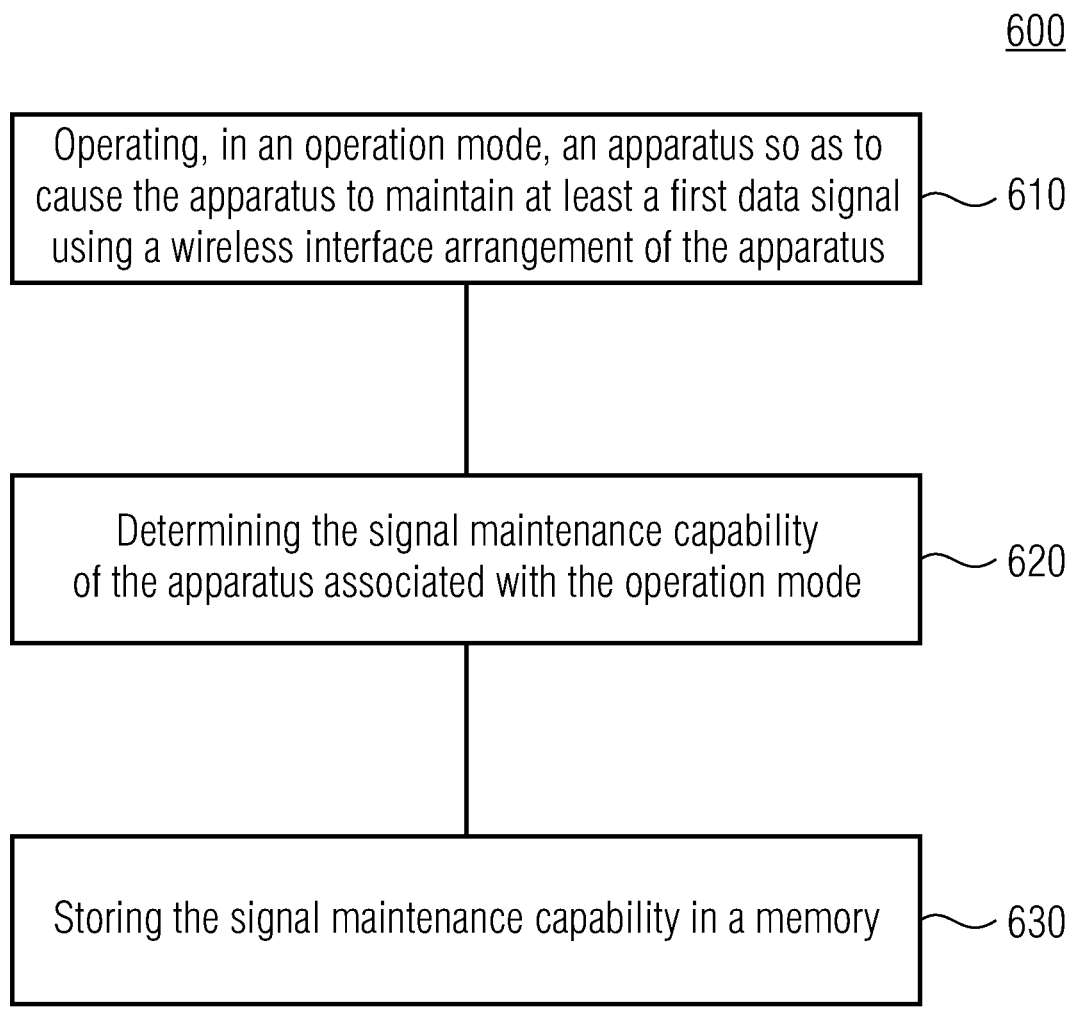
FIG. 6 a schematic flow chart of a method for operating an apparatus according to an embodiment.

For obtaining information about a signal maintenance capability to be distributed in the network as described in connection with FIG. 1 to FIG. 5, embodiments provide for a method 600 being illustrated in FIG. 6. A step 610 comprises operating, in an operation mode, an apparatus so as to cause the apparatus to maintain at least a first data signal using a wireless interface arrangement of the apparatus. That is, in step 610, the apparatus may be tested in view of a number of data streams or data signals to be maintained in the operation mode. In a step 620, the signal maintenance capability of the apparatus within the operation mode is determined. In a step 630, the signal maintenance capability is stored in a memory. Optionally, the operating mode may be stored together with the maintenance capability in the memory. Such storing may be performed implicitly, for example, when the apparatus 10 only has a single operating mode to be determined or examined.

The method may, optionally, comprise a step of changing the operation mode of the apparatus with respect to the at least one data signal. The method may comprise determining the signal maintenance capability of the apparatus associated with the changed operation mode. The method may further comprise storing the changed signal maintenance capability in the associated changed operation mode in the memory. That is, it may be of advantage to store the signal maintenance capability together with the operation mode in case the apparatus is able to operate under different operation modes that are associated with different data stream capabilities.

Changing the operation mode may be related to at least one of change of a correlation between antenna elements of the apparatus, e.g., by activating or deactivating one or more antenna elements, antenna panels or antenna arrays. Alternatively or in addition, changing the operation mode may be related to a change in a channel propagation to or from the antenna elements of the apparatus, e.g., when a user is located at least partly along a direction along which a beam may be formed or is intended to be formed. Alternatively or in addition, the change of the operation mode may be related to a change of an orientation of the apparatus with respect to a base station or a link antenna of a measurement equipment used for testing the apparatus, similarly as described in connection with FIGS. 3a and 3b, whilst the receiving apparatus 18 may be implemented by one or more link antennas. Such a link antenna may simulate for at least parts of a functionality of a base station. Alternatively or in addition, a change in the operation mode may be related to a change in a number of data channels maintained between the measurement set up and the apparatus.

The method 600 as well as the described extension, for which each step may be performed independently, may be performed so as to rely on a channel model in which an antenna correlation between antennas used for a signal transmission using the signal maintenance capability and/or an antenna correlation between antennas used for a signal reception using the signal maintenance capability is considered. As an antenna it is understood an arrangement of one or more antenna elements suited for combinatorially transmitting or receiving a signal. That is, in an antenna array, an antenna element is the smallest radiating part of the array. The antenna correlation of antennas may be of higher interest when compared to antenna correlation between elements of a same antenna.

Operating the apparatus in the operation mode may be performed such that the apparatus maintains the at least a first data stream in a specific reference condition for a channel. For example, the apparatus may be tested in a measurement environment, e.g., in a measurement chamber such as an anechoic chamber. The apparatus may be illuminated from one or more sides so as to simulate the specific reference condition. Illuminating may be done from all sides at a time, from different sides at different times, e.g., corresponding to the antennas examined at this time; and/or from a constant direction whilst moving or rotating the apparatus. The method may further comprise determining the antenna correlation at least between a first antenna and a second antenna of the wireless interface arrangement.

That is, the antenna correlation that at least indicates the impairment between antenna may be determined under the reference condition. That is, the signal maintenance capability may be determined in view of the reference condition of the channel. The antenna correlation may be determined so as to comprise an information about the antenna correlation of antenna in different antenna arrangements of the wireless interface arrangement.

The method may alternatively or in addition performed such that the signal maintenance capability is determined for at least a first use case and a second use case of the apparatus; the first use case and the second use case differing in view of antenna used by the apparatus in the operating mode. For example, the different use cases may refer to different antenna and/or different antenna arrangements of the apparatus for maintaining the data stream. E.g., based on a rotation of the apparatus and/or user relative to the base station, the apparatus may maintain the same data stream but may use a different antenna panel or antenna arrangement or sets thereof for communication therefore changing the use case. Alternatively or in addition, a use may change based on other situations. For example, a user may change its relative position to the apparatus, e.g., holding the apparatus to a different ear, taking the apparatus from a table and put it next to a head or the like. The apparatus may detect such changes and may change its utilization of the wireless interface arrangement, e.g., to avoid forming a beam to or through the user's head. The signal maintenance capability may be stored together with the use case. That is, the apparatus may react on determined changes change in a channel propagation to or from the antennas of the apparatus.

The apparatus may report its signal maintenance capability together with an associated use case and/or may report a change in the signal maintenance capability during operation, e.g., when having switched from one operation mode or use case to another.

Figure 7:
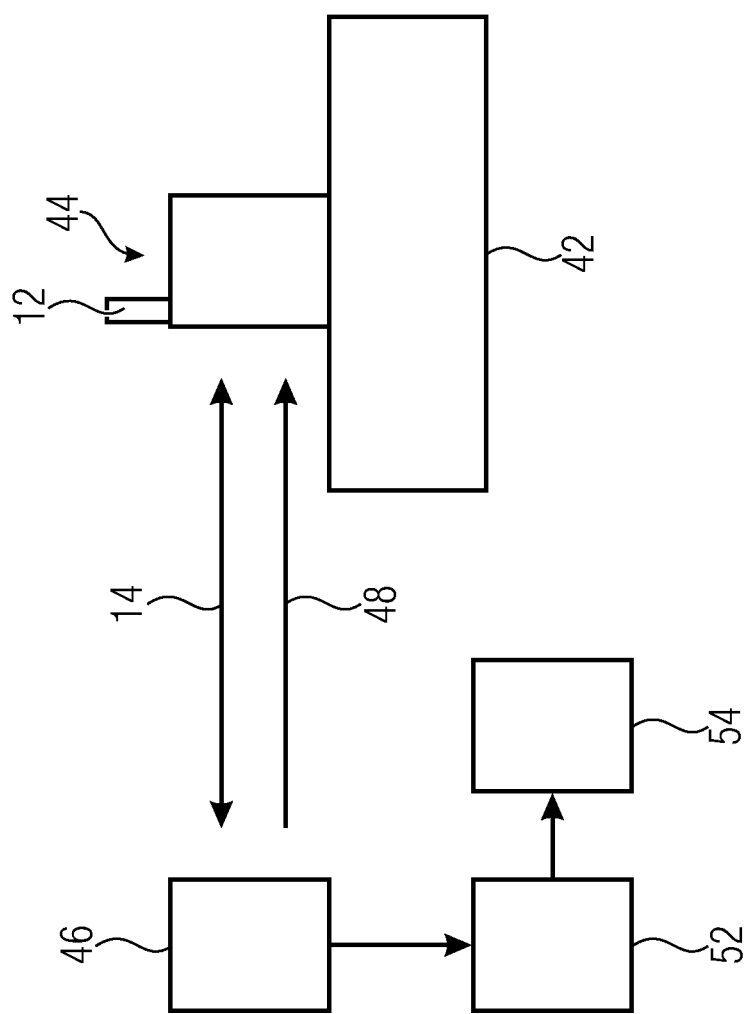
FIG. 7 shows a schematic block diagram of a measurement environment according to an embodiment.

FIG. 7 shows a schematic block diagram of a measurement environment 700 according to an embodiment. The measurement environment 700 comprises a holder 42 configured for holding an apparatus 44, e.g., the apparatus 10 and/or 20 or a device of a similar type. The measurement environment 700 comprises a control unit 46 configured for controlling the apparatus 44 so as to operate the apparatus under an operation mode. The control unit 46 may cause the measurement environment 700 to transmit one or more control signals 48 in a wired or wireless manner to the apparatus 44 so as to control its operation mode. In the controlled operation mode, the apparatus 44 may maintain at least one data stream 14 using the wireless interface arrangement of the apparatus 44.

The measurement environment 700 may comprise a determining unit 52 configured for determining the signal maintenance capability of the apparatus 44 associated with the operation mode. The measurement environment 700 may comprise a memory 54 configured for storing the signal maintenance capability, optionally, together with the associated operation mode.

A method in accordance with an embodiment, for example, implemented or executed at least partly by use of the measurement environment 700, comprises connecting an apparatus to be tested to a measurement environment or placing the apparatus in the measurement environment. For example, the apparatus may be placed on the holder 42, e.g., a chuck, a jig, a table, a floor or the like. The method comprises transmitting a number of multiplexed signals to the apparatus, for example, using a link antenna. The method comprises demultiplexing the multiplexed signals with the apparatus, e.g., the apparatus 44. A result of the demultiplexing may be transmitted back to the measurement environment. The method comprises comparing the demultiplexed signals with the multiplexed signals so as to obtain a comparison result. That is, it may be determined if the apparatus 44 has successfully demultiplexed the multiplexed signals. Based thereon, the signal maintenance capability of the apparatus may be determined based on the comparison result. That is, it may be tested if the apparatus is able to demultiplex the number of multiplexed signals. The test may be done iteratively such that a number of multiplexed signals to be transmitted to the apparatus may increase or decrease in different iterations. This may be implemented so as to find a maximum number of multiplexed signals that may be demultiplexed with the apparatus.

The comparison result may thus be determined so as to indicate a number of signals successfully demultiplexed. According to an embodiment, demultiplexed signals may be provided to the apparatus and it may be determined, if the apparatus is able to successfully multiplex the signals. For comparing multiplexed signals with the demultiplexed signals, a use of a signal processing technique may be used, for example, a correlation function or an autocorrelation function.

According to an embodiment, the method for determining the signal maintenance capability may optionally contain one or more of the following steps: connecting the apparatus or placing the apparatus in the measurement environment, providing a number of signals to the apparatus, causing the apparatus to multiplex the number of signals and to transmit the number of multiplexed signals to the measurement environment, demultiplexing the multiplexed signals with the measurement environment and comparing the demultiplexed signals with the multiplexed signals so as to obtain a comparison result. Further, the signal maintenance capability may be determined based on the comparison result. Thereby, the comparison result may be determined so as to indicate a number of signals successfully multiplexed. Comparing the demultiplexed signals with the multiplexed signals may also be implemented by use of a signal processing technique.

The embodiments described relate to a UE that reports certain capabilities and to how the knowledge of same may benefit both, the UE and the network. As mobile broadband communication networks continue to evolve from one generation to the next, for example, from 4G Long Term Evolution (LTE) to 5G New Radio (NR) and beyond, not only do the number of mobile devices supported by these networks increase but also the number of device types. In other words, these networks are required to support an ever-increasing variety of user equipment (UE) and provide the required Quality of Service according to each UE's category or capability. Within standardization groups such as 3GPP, the discussion of UE capability is an ongoing topic as shown, for example, in 3GPP TR 23.743 V0.2.0 (2018-08).

At the base station, multi-antenna systems and their associated techniques enable radio access networks to provide higher data rates, increased capacity and improved reliability in a more spectrally efficient and energy conscious manner. For 5G NR, such developments are relevant to frequency bands in the range of frequencies known as frequency range 1-FR1 (450 MHz-6,000 MHz) and frequency range 2-FR2 (24,250 MHz-52,600 MHz). These techniques are, however, pertinent to any particular operating frequency, regardless of the current definition of FR1 and FR2, to future releases and to evolutions and systems of the future that go beyond 5G.

In "Effect of Antenna Mutual Coupling on MIMO Channel Estimation and Capacity" (Xia Liu and Marek E. Bialkowski, School of ITEE, The University of Queensland, Brisbane, QLD 4072, Australia) it is stated that "The mathematical analysis and simulation results have shown that when the antenna element spacing at either transmitter or receiver is within 0.2 and 0.4, the mutual coupling decreases the spatial correlation level and undermines the estimation accuracy of the MIMO channel." The design and implementation of the antennas used in an UE will affect its ability to accurately assess channel characteristics. This may also affect the UE's to maximize its performance in higher ranking MIMO channels.

Further embodiments provide for a method for evaluating a radio propagation channel between a first node and a second node in a wireless communication network. An example for this embodiment is illustrated in FIG. 8 showing a schematic flow chart of a method 800 for evaluating the radio propagation channel between a first node and a second node in a wireless communication network. A step 810 comprises measuring a property of the radio propagation channel between the first node and the second node so as to obtain a measurement result. A step 820 comprises correcting the measurement result at least partly from interference or impairment caused from operating a first communication chain of the first node on a second communication chain of the first node and/or correcting the measurement result at least partly from impairment caused from operating a third communication chain of the second node on a fourth communication chain of the second node. Each communication chain is configured for wirelessly transmitting and/or wirelessly receiving signals using a wireless interface. By correcting the measurement result, a corrected measurement result of the propagation channel is obtained.

Embodiments described herein relate, at least in parts, to interference, e.g., in connection with step 820. In the context of radio signal transmission and reception, the term interference may be used to describe an unwanted signal that affects the transmission/reception of a wanted signal. With respect to the wanted signal, and in some instances, the unwanted signal can be considered to be a form of noise. In connection with the embodiments described, such kind of interference may also be understood as impairment, i.e., an effect on one signal on another.

An apparatus configured for wirelessly transmitting and/or receiving signals may utilize a communication chain for transmitting or receiving a signal. A communication chain is used as a term describing a transmission chain and/or a reception chain. Such a chain may comprise amplifiers, digital-to-analog and/or analog-to-digital converters, antenna elements, signals processing steps and the like.

An apparatus may comprise one or more communication chains. For example, a plurality or even a multitude of transmission chains and/or a plurality or even a multitude of receiving chains may be implemented, in particular in connection with MIMO devices. Therefore, the presented method also applies to an apparatus such as apparatus 10, 20, 24 or 44.

Figure 9A:
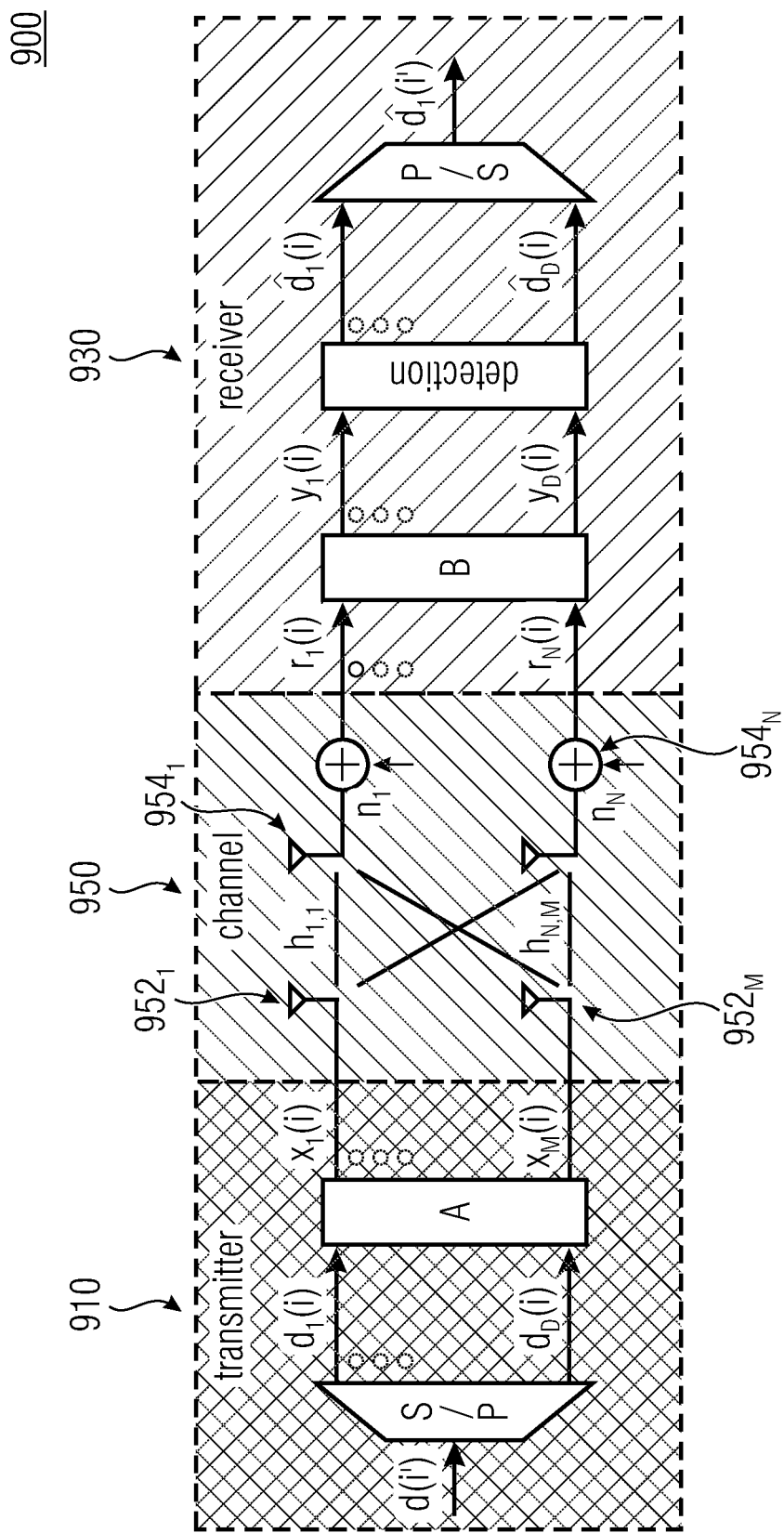
FIG. 9a shows a schematic block diagram of a well-known model of a radio propagation channel.

The inventors have found that it is of particular interest and advantageous to consider the transmission chains including the antenna elements used thereof as part of the device and not as part of the radio propagation channel. For example, FIG. 9a shows a schematic block diagram of a well-known model of a radio propagation channel 900 comprising a section 910 relating to the transmitter, comprising a section 930 relating to the receiver and comprising a section 950 relating to the channel. Antenna elements $952_1$ to $952_M$ used by the transmitter for different transmission chains $d_1(i)$ to $d_D(i)$ are considered as being part of the channel 950. So are antenna elements $954_1$ to $954_N$ of the receiver. The well-known model of FIG. 9a shows a configuration in which the channel 950 comprises both propagation and antenna effects. In this sense, the channel is better referred to as "radio channel".

Figure 9B:
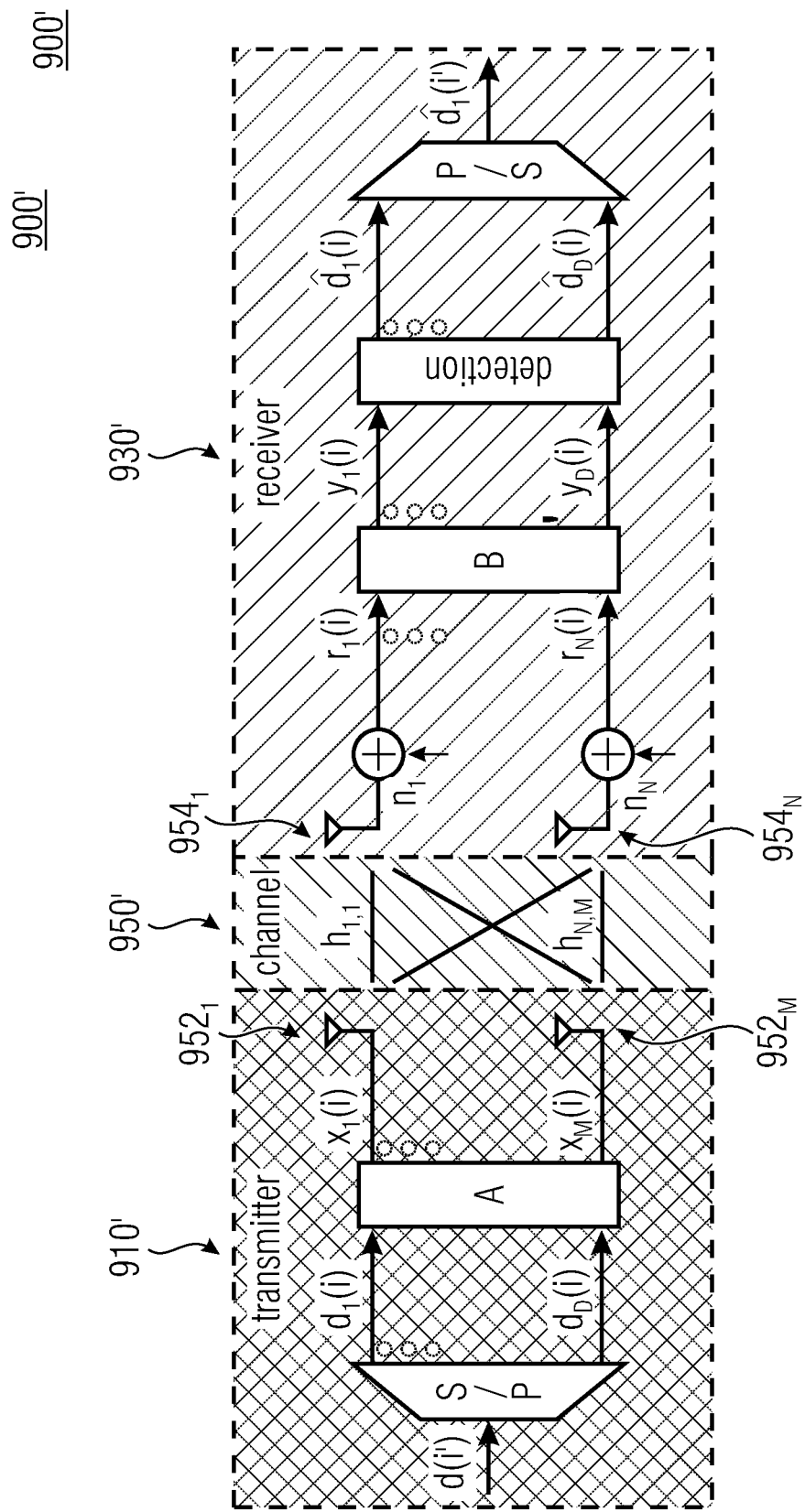
FIG. 9b shows a schematic block diagram of a known form of the communication model being referred to as propagation channel.

In FIG. 9b, a less known form of the model is shown, in which the channel comprises propagation effects only. In this sense, the channel may be referred to as "propagation channel". The antenna elements 953 and 954 are considered to be part of the transmitter 910', the receiver 930' respectively.

Figure 9C:
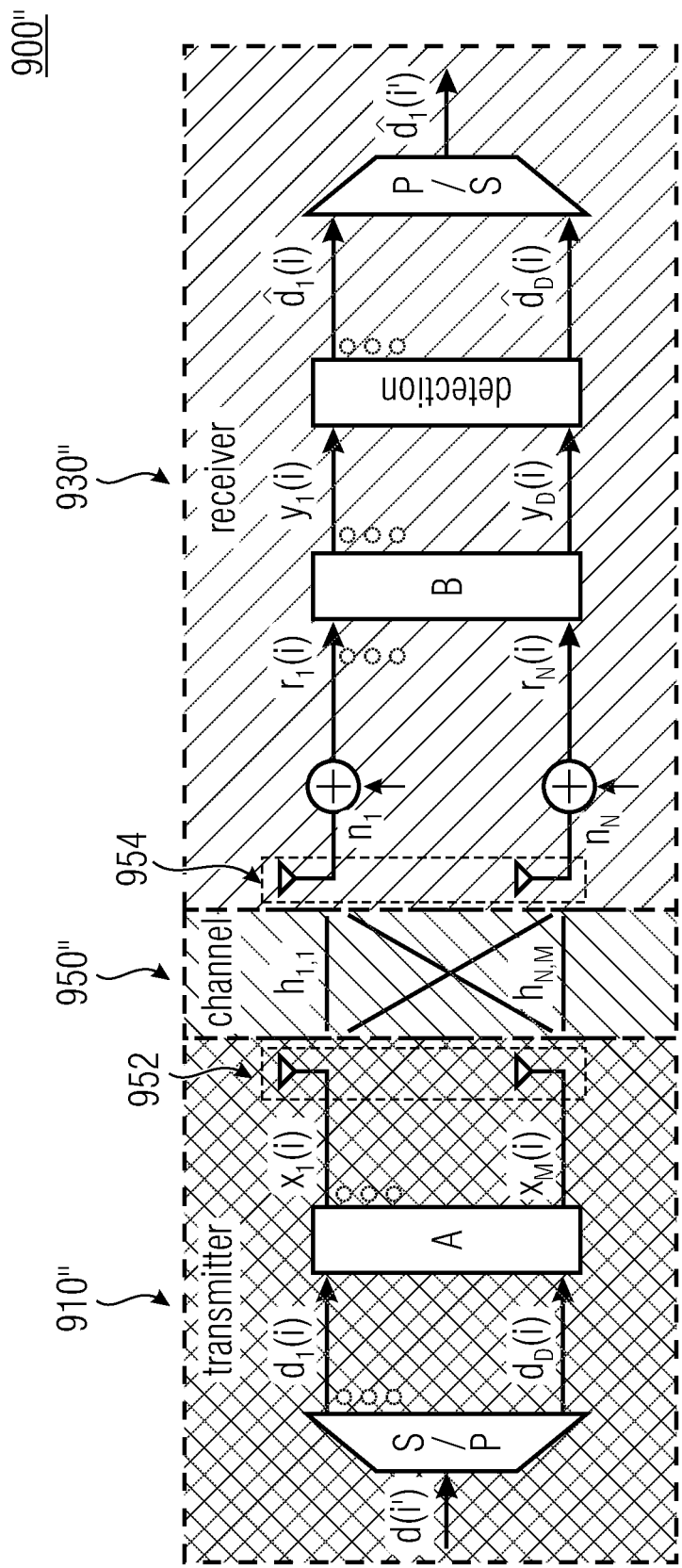
FIG. 9c shows a schematic block diagram of a channel model underlying at least some of the embodiments described herein.

In contrast hereto, FIG. 9c shows a schematic block diagram of the channel model underlying at least some of the embodiments described herein. It is based on the finding that an antenna correlation between the antenna elements 952 (transmit antennas) and/or a cross-correlation between the antenna elements 954 (receive antennas) may be considered. This allows correcting the measurement result of method 800 so as to obtain the property of the radio propagation channel 950" independently from antenna properties of the first node and the second node, i.e., the transmitter and the receiver. Such impairment information being obtained may be stored in a memory. The impairment information stored in the memory may be read from the memory at a later time and a wireless communication may be set up in a wireless communication channel using the impairment information to determine the property of the wireless communication channel independent from the impairment. That is, in particular in connection with the capability information, apparatus that comprise a plurality of antenna elements or antenna arrangements in a wireless interface arrangement may face antenna correlation in the transmit antennas and/or the receive antennas. This antenna correlation may at least in parts be influenced by a construction form or design of the apparatus such that different designs or locations or distances between antenna elements may have different antenna correlations. This may lead to different data stream capabilities in different operating modes and/or orientations or the like even if different apparatus having different designs may comprise a same number of antennas. Embodiments relate to identifying such influence and to correcting measurement results based on this finding.

Correcting the measurement result may be performed such that the corrected measurement result of the propagation channel may exclude antennas of the first node and the second node from a propagation channel model modelling the propagation channel. Alternatively or in addition, the method may comprise using the corrected channel propagation information for adjusting a wireless communication. Adjusting the wireless communication may comprise at least one of a prompt or immediate adjustment of a running or ongoing or existing communication, an adjustment at the beginning of a next burst, slot, sub-frame, frame or hyper-frame of the wireless communication, adjustments of a change of frequency, beam, antenna panel, antenna polarization, power, modulation and/or coding, radio access technology (RAT), a change of the network, a change of orientation of an apparatus, a change of a direction of communication and a use case. Alternatively or in addition, the adjustment may be queued, i.e., it may be performed at a later stage. Combinations are included.

According to an embodiment, the method 800 may comprise requesting the adjustment at a network entity and processing the request. The method comprises not performing the adjustment in case of a negative feedback. That is, the adjustment may be announced and in case an apparatus replies a negative feedback, the adjustment may be skipped or waived.

The method 800 may alternatively or in addition comprise storing an adjustment and/or an adjustment request for subsequent analysis and/or performance optimization of the apparatus and/or the apparatus.

Based on this consideration, embodiments provide for an apparatus, e.g., apparatus 10, 20, 24 and/or 44, comprising a memory having stored thereon impairment information indicating an impairment caused from operating a first communication chain of the apparatus on a second communication chain of the apparatus, e.g., impairment between antenna elements 952 and/or impairment between antenna elements 954. Such an apparatus may optionally be configured for transmitting the impairment information to a further information such that it may consider the properties of the apparatus. In connection herewith, embodiments provide for an apparatus, e.g., a receiving apparatus such as apparatus 18 or the base station 40, configured for controlling a wireless communication to a further apparatus based on impairment information indicating an impairment caused from operating a first communication chain of the further apparatus on a second communication chain of the further apparatus. That is, the apparatus may consider impairment that will be caused at the other apparatus when using specific settings of the wireless communication. For example, knowledge may be used that a specific combination of beams, frequencies, codes or the like leads to an increased impairment when compared to other combinations such that the apparatus may prefer combinations with lower impairment over other combinations.

In other words, referring again to FIG. 9c, the boxes 952 and 954 refer to the antenna correlation of antennas. Box 952 relates to TX antennas, e.g., at the base station. Antennas 954 relate to RX antennas, e.g., at the UE. The transmitter, e.g., the base station, may be provided with antenna correlation via manufacturers' declarations. A TX correlation (of the base station antennas), e.g., a one-time process since the correlation is unlikely to ordinarily change. The RX correlation (of the UE antennas) may be provided in a dynamic process as each new UE is connected in a call and the UEs are invariably of different type/design/manufacture/user configuration. The receiver, e.g., the UE, may provide updated antenna correlation information according to how the UE is held/positioned. The correlation information may be used by the transmitter (base station) to improve the estimation of the propagation channel, to improve the quality of the channel pre-coding, to achieve the required channel quality faster, to reduce adaption time and/or to respond to changes more quickly.

The embodiments described in connection with the capability information being transmitted to a receiving mode apply also to base stations. For example, in a given area/location, the base station is provided up to, e.g., rank 4 for single user MIMO or, e.g., rank 8 for multiuser MIMO (4× rank 2) and at an adjacent location, it may keep the full SU-MIMO (Single-user MIMO) rank. This in in contrast to usual cell center high rank and cell edge low rank as it may provide consistency of user experience in space over an entire coverage region in multi-cell environment. A result of beam forming optimization may be verified. It may be measured by in-situ measurement, for example by using UEs in the field that report the observed rank and SU-MIMO rank consistency in space/location/coverage area. The UE's directionality may be considered and averaged out. Low rank capable UEs may provide wrong results about the SU-MIMO rank in space area. The reporting can be dynamic depending on how the UE is held, e.g., certain positions might create a low rank resolution for the UE. The UE may report its maximum rank capability, for example, when registering to the network or regularly from time to time. With this information, the network knows what to expect from the UE in a given environment. Embodiments introduce a new metric describing a ratio of best to lowest layer performance (MSC level) or best/worst eigenvalue. As a measure, for example, of multiplexing robustness in a given environment, a superposition of propagation environment and base station transmit strategy and resulting UE capability may be obtained. At a certain given rank and balance of multi-layer transmission, the UE capability in such environment/probing can be tested.

The results may be UE specific. A UE may have a different number of stream to downlink and uplink, e.g., 4 Rx, 2 Tx and the base station may possibly be unable to estimate the UE antenna/receiver capability from observation of signals transmitted by the UE to the base station. Therefore, embodiments provide for a feedback on the spatial beam separation capability in both direction under known spatial decorrelation by propagation. Further, a measurement environment and base station beam forming is described.

Furthermore, if some spatial relationship between Tx and Rx antenna patterns is known (measure of how well the Tx and Rx patterns correspond), one can be used to optimize the other. For example, the analog beam forming network from 4 Rx antennas to 4 Rx ports may be used to create 2 Tx beams using all 4 antennas or some of them.

Embodiments provide for a test that allows conformance test of multi-stream performance (single user MIMO) to allow for Nx max MCS/modulation, e.g., 256 QAM or different, e.g., 1024 QAM, for FR1 and 64 QAM up to 256 QAM for FR2. Embodiments provide further for a measurement environment equipped to provide multi-stream with full rank >2 or alike with spatial stream separation of X dB, i.e., a test if the UE can do, e.g., full MUX or impairment suppression. A test rank of 1, 2, 3, 4, . . . , etc. may be implemented. Embodiments do not focus on a wireless cable with long-term stable phase and channel estimation. Instead, embodiments target spatial separability of streams as a property of the test environment. This is implemented by using specific rank co-polarized, cross-polarized and hybrid mixtures of polarization.

As a further aspect, over-the-air (OTA) tests may be used to obtain an OTA performance that may at least partly depend on a perceived rank and signal decorrelation. A UE may report its observed maximum rank, its capability information. This may be a superposition of the channel and the capabilities of the UEs. Using the antenna test function (ATF), embodiments introduce an ATF-prime after MIMO equalization, meaning the power and the SINR of decorrelated streams with or without power correction may be performed, indicating an MUX level.

Further, embodiments allow to exploit that changing the metric allows extraction of the resulting inter-stream impairment representing stream coupling. This can be used by measurement equipment of gNB to further decouple multiplexed streams.

The UE spatial capability may set an upper limit for the exploitable performance enhancing measurements.

Embodiments may allow to reduce the amount of signaling, power consumption and impairment.

Embodiments allow to classify the UE in (spatial) capability classes where the capability might be direction dependent. For example, a certificate might state that the UE is rank 4 capable in 30% of sphere, rank 3 in 50% and rank 2 in 80%, etc. Any other arbitrary number of ranks and/or sizes of the sphere are possible.

The principle on which the embodiments rely can be extended to carrier aggregation including dual connectivity, e.g., LTE+NR/EN-DC, performance measurement for concurrent DL-CA, UL-CA and UL-DL-CA (DL=downlink, UL=uplink, CA=carrier aggregation). Here, the scheduler and network synchronization may play a role, too. This may result in a category/score/KPI (key performance indicator) based on testing criteria.

Information used by other entities in the network for the overall link and network optimization is provided.

Information about the UE or UE capability categorization is provided to the network and is updated if an effective capability depending on, e.g., network configuration or channel, such that the individual links and the network performance can be optimized.

For Mobile Network Operators (MNOs), if the UEs have confirmed spatial capabilities, then the MNO can use them to test and optimize network performance by optimizing base station antenna, matching the channel propagation characteristic of a particular site or deployment.

The first aspect relates to reporting the spatial stream separation capabilities of a device:

a) Device capabilities can change according to use cases (hand, head and body effects), orientation, frequency of operation [carrier aggregation {intra-band contiguous/non-contiguous, inter-band}], selection of antenna panel, direction of beam(s).

b) Includes UE, IoT device and base station equipment.

c) Devices which are receptive to the capability information should be able to use the information to adjust/adapt/improve/optimize the generation/creation of spatial streams according to defined criteria—not always to "increase", sometimes to "decrease" (for example when limiting factors are known/detected/anticipated).

The second aspect relates to measurement method and defines a) how the spatial separation capability is determined b) what technique is used to create and radiate spatially separated streams that maintain the required characteristics throughout transmission c) what methods can be used to control/check/measure the spatial separation of the streams delivered to the device under test The third aspect relates to mechanisms that optimize performance through knowledge of device capabilities a) Traditionally, the characteristics of both the transmit and receive antennas are "lumped" together with the characteristics of the "propagation channel" to form a single entity called the "radio channel". By assessing the characteristics of both the transmit and receive antennas (optionally together with their radio frequency front-end circuitry used for either both transmission or reception [not to ignore various forms of duplex operation including full duplex]), the propagation channel per se can be treated as a single entity. In essence, the "radio channel" is partitioned into: a transmit chain that includes the transmit antennas; the propagation channel; and a receive chain that includes the receive antennas. The correlation between two or more transmit chains including their antennas can be determined (see 2 above)—so too can that of the two or more receive chains including their antennas.

Such information is now known independently from the radio channel thus allowing better estimation of the prevailing propagation channel.

Embodiments provide for an apparatus (e.g. a base station, a terminal (including a UE), an IoT device, a test equipment, a test environment) comprising a combination of transmit antennas and transmission chains and a combination of receive antennas and reception chains wherein each combination has certain characteristics and those characteristics can be assessed in order to determine a capability of either or both of the combinations. In other words: a) the transmission capability of the apparatus and the reception capability of the apparatus need not necessarily be identical; b) it might be possible/necessary/useful to determine the capability of only the transmission combination, the reception combination or both combinations together. While the assessment of the apparatus is typically made using test and measurement equipment (a measurement environment) and normally before deployment in a network, further assessment methods should not be excluded examples of which include self-assessment (through built-in test equipment (BITE) functionality), network-assisted assessment in which one or more base stations and/or one or more terminals are configured/orchestrated to perform such an assessment.

b) The Tx branch correlation and the Rx branch correlation information can be used to adjust/adapt/improve/optimize the characteristics of the spatially separated streams.

This may be performed in a time domain, a frequency domain, a code domain, a spatial domain, an orbital angular momentum, an angular difference of a lobe or null or a part thereof and a polarization domain The used measure may be at least one the measure is at least one of: an error vector magnitude (EVM); a signal-to-interference-plus-noise ratio (SINR); a bit error rate (BER); a block error rate (BLER); and a combination thereof.

Furthermore, adjustments can be made according to frequency division multiplexing (FDM) criteria which can include carrier aggregation wherein certain band combinations become a capability per se as too do the bands which are used as primary and/or secondary carriers. Yet a further example is the use in multi-network or multiple radio access technologies (multi-RAT) in dual-connectivity (DC) [also between different RATs] or multi-connectivity [also between different RATSs].

Adjustments can be made automatically in response to certain criteria (thresholds/events/network signalling/built-in performance self-measurement/a sensed change of usage/low-battery level/temperature detection/interference indication).

Adjustments can be made immediately.

Adjustments can be scheduled to the occur at the beginning of the next burst/slot/sub-frame/frame.

Adjustments can be initiated with a change of frequency/beam/antenna panel/antenna polarization/power/modulation or coding or both/RAT/network/orientation/direction/use case.

Adjustments can be queued/sequenced/delayed/scheduled.

Adjustment requests can be processed (i.e., accepted or rejected or referred to a higher entity for further processing).

Adjustments and adjustment requests can be stored for subsequent analysis and/or performance optimization of the apparatus and/or the network.

Adjustments and adjustment requests can be stored in the apparatus, the network, a test environment.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus comprising a memory having stored therein impairment information indicating an impairment caused from operating a first communication chain or a communication link of the apparatus; and/or
   wherein the apparatus is configured for controlling a wireless communication to a further apparatus based on impairment information indicating an impairment caused from operating a first chain of the further apparatus on a second chain of the further apparatus;
   wherein the apparatus, is configured to report its effective channel and a corresponding rank, it faces in the wireless communication;
   wherein a change in the rank, is based on at least one of:
   a change in the effective channel;
   an operation mode of the apparatus;
   regulatory requirements;
   user interaction; or
   a property of the device.

2. The apparatus of claim 1, wherein the apparatus is configured for transmitting the impairment information to a further apparatus.

3. An apparatus configured for wirelessly communicating in a wireless communication network, the apparatus comprising:
   a wireless interface arrangement having a signal maintenance capability to separate at least one data stream;
   wherein the apparatus is configured for wirelessly transmitting, to a receiving apparatus, a capability signal comprising a capability information indicating the signal maintenance capability; and at least one of:
   wherein the signal maintenance capability relates to a device capability forming an upper limit for the communication within the wireless communication network independent from a propagation environment of the apparatus;
   wherein the capability information indicates at least a capability of the apparatus to utilize an indicated number of beams transmitted with the wireless antenna arrangement;
   wherein the wireless interface arrangement is configured for transmitting a first spatial data stream with a first beam; and for transmitting a second spatial data stream with a second beam, wherein the wireless interface arrangement is configured for separating the first spatial data stream from the second spatial data stream based on the signal maintenance capability;
   wherein the apparatus is configured for determining that the signal maintenance capability is changed to a varied signal maintenance capability and to report the varied signal maintenance capability to the receiving apparatus; and
   wherein the capability information is device specific for the apparatus; or device class specific for a class of devices to which the device belongs.

4. The apparatus of claim 3, wherein the apparatus is configured for determining that the signal maintenance capability has changed based on at least one of: an operation mode of the apparatus; or a position of at least a part of a user relative to the apparatus.

5. The apparatus of claim 3, wherein the apparatus is a UE or an Internet-of-Things device and the capability information relates to an uplink capability of the apparatus.

6. The apparatus of claim 3, being a base station, wherein the capability information relates to a downlink capability of the apparatus.

* * * * *